United States Patent
Baluja et al.

(10) Patent No.: US 12,345,560 B2
(45) Date of Patent: Jul. 1, 2025

(54) ASSEMBLIES, CIRCUITS, AND METHODS OF TRANSMITTERS BETWEEN DIFFERENT EQUIPMENT PROTECTION LEVELS IN A HAZARDOUS ENVIRONMENT

(71) Applicant: ABB Schweiz AG, Baden (CH)

(72) Inventors: Wilfredo Fernando Baluja, Warminster, PA (US); Chang Liu, Shanghai (CN); Yasong Yu, Shanghai (CN); Andrzej Jaroslawski, Raleigh, NC (US); Wouter Frans Aerts, Brussels (BE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/792,324

(22) PCT Filed: Aug. 4, 2021

(86) PCT No.: PCT/CN2021/110618
§ 371 (c)(1),
(2) Date: Jul. 12, 2022

(87) PCT Pub. No.: WO2023/010347
PCT Pub. Date: Feb. 9, 2023

(65) Prior Publication Data
US 2024/0175741 A1    May 30, 2024

(51) Int. Cl.
*G01F 23/62*    (2006.01)
*F16L 5/10*    (2006.01)
*H02H 9/02*    (2006.01)

(52) U.S. Cl.
CPC .............. *G01F 23/62* (2013.01); *F16L 5/10* (2013.01); *H02H 9/02* (2013.01)

(58) Field of Classification Search
CPC ..... H01Q 1/225; G01F 23/284; G01D 11/245
See application file for complete search history.

(56) References Cited

U.S. PATENT DOCUMENTS 3,980,542 A * 9/1976 Winslow, Jr. .......... F16L 58/00
                                                    324/700
4,301,325 A   11/1981 Hutchison
(Continued)

FOREIGN PATENT DOCUMENTS

CN    106441609 A    2/2017
CN    210375306 U    4/2020

OTHER PUBLICATIONS

Extended European Search Report for App. No. 21189682.4 dated Jan. 25, 2022, 9 pgs.
(Continued)

*Primary Examiner* — Tran M. Tran
(74) *Attorney, Agent, or Firm* — McCarter & English, LLP; Michael M. Gnibus

(57) ABSTRACT

The disclosure relates to a transmitter assembly for a hazardous environment. The transmitter assembly includes a transmitter that includes a transmitting unit and a probe. The transmitting unit is configured to be positioned in a first area and includes an intrinsically safe circuit. The probe is configured to be positioned in a second area that is more hazardous and has a higher equipment protection level than the first area. The probe is electrically connected directly or indirectly to the intrinsically safe circuit. The transmitter assembly also includes a separation assembly positioned between the transmitting unit and the probe and including a hermetic seal configured to be electrically connected to the transmitting unit and the probe and a nut defining a tunnel sized to receive the hermetic seal therein. The exterior threads of the nut are complementary to threads on a partition wall positioned between the transmitting unit and the probe.

18 Claims, 16 Drawing Sheets

(56) References Cited

U.S. PATENT DOCUMENTS

| | | | | |
|---|---|---|---|---|
| 4,666,228 A * | 5/1987 | Wood | | H01R 13/746 |
| | | | | 439/559 |
| 4,981,038 A | 1/1991 | Torres et al. | | |
| 5,399,807 A | 3/1995 | Yarbrough | | |
| 5,440,455 A * | 8/1995 | Rottmar | | G01F 23/00 |
| | | | | 361/752 |
| 5,481,197 A * | 1/1996 | Sanders | | F17C 13/021 |
| | | | | 73/304 C |
| 5,955,684 A | 9/1999 | Gravel et al. | | |
| 6,125,697 A * | 10/2000 | Holton | | G01F 23/0038 |
| | | | | 73/309 |
| 6,148,681 A * | 11/2000 | Gravel | | H01R 13/527 |
| | | | | 73/866.5 |
| 6,639,495 B2 * | 10/2003 | Cage | | G01F 1/586 |
| | | | | 335/229 |
| 6,708,834 B2 * | 3/2004 | Hagerman, III | | G01F 15/14 |
| | | | | 73/204.22 |
| 6,799,984 B2 * | 10/2004 | Starta | | H01R 13/71 |
| | | | | 439/246 |
| 7,255,002 B2 * | 8/2007 | Gravel | | G01F 23/284 |
| | | | | 73/866.5 |
| 7,367,831 B2 * | 5/2008 | Starta | | H01R 13/527 |
| | | | | 439/246 |
| 7,370,791 B2 * | 5/2008 | O'Dougherty | | G05B 19/0425 |
| | | | | 235/375 |
| 7,430,811 B2 * | 10/2008 | Williams | | F16L 19/103 |
| | | | | 33/645 |
| 7,795,783 B2 * | 9/2010 | Trochesset | | G01F 1/662 |
| | | | | 73/861.27 |
| 7,878,832 B2 * | 2/2011 | Hui | | H01R 13/59 |
| | | | | 439/271 |
| 8,111,167 B2 * | 2/2012 | Kopp | | G01F 23/28 |
| | | | | 73/756 |
| 8,873,241 B2 * | 10/2014 | Muldowney | | G01F 15/063 |
| | | | | 361/752 |
| 9,052,245 B2 * | 6/2015 | Kihara | | G01L 13/026 |
| 9,291,492 B2 * | 3/2016 | Fredriksson | | G01S 13/88 |
| 9,360,407 B2 * | 6/2016 | Dales | | G01F 23/2885 |
| 9,520,599 B2 * | 12/2016 | McGuire | | H05K 7/1462 |
| 9,778,089 B2 * | 10/2017 | Edvardsson | | G01S 13/88 |
| 10,066,979 B2 * | 9/2018 | Hrncir | | G01F 23/284 |
| 10,077,794 B2 * | 9/2018 | Ellingson | | F16B 35/06 |
| 10,412,348 B2 * | 9/2019 | Pool | | H04N 23/651 |
| 10,476,305 B2 * | 11/2019 | Freer | | H05K 5/0217 |
| 10,480,985 B2 * | 11/2019 | Kleman | | H01Q 1/225 |
| 10,508,947 B2 * | 12/2019 | Roderes | | G01F 23/266 |
| 10,948,332 B2 * | 3/2021 | Kleman | | G01S 13/343 |
| 10,982,988 B2 * | 4/2021 | Wernet | | H01R 4/56 |
| 11,092,631 B2 * | 8/2021 | Lalla | | G01F 1/8413 |
| 11,174,036 B2 * | 11/2021 | Carralero | | B64D 37/04 |
| 11,248,936 B2 * | 2/2022 | Chen | | F16L 27/08 |
| 11,378,438 B2 * | 7/2022 | Hall | | G01F 23/22 |
| 11,415,437 B2 * | 8/2022 | Hay | | G01D 11/245 |
| 11,415,451 B2 * | 8/2022 | Mimeault | | G01S 13/88 |
| 11,662,243 B2 * | 5/2023 | Eriksson | | G01F 23/284 |
| | | | | 342/124 |
| 11,978,980 B2 * | 5/2024 | York | | H01R 13/527 |
| 2003/0201842 A1 | 10/2003 | Gard | | |
| 2005/0025608 A1 | 2/2005 | Fedor | | |
| 2009/0084197 A1 * | 4/2009 | Lohr | | G01L 5/0004 |
| | | | | 73/862.627 |
| 2010/0026518 A1 | 2/2010 | Kirst et al. | | |
| 2010/0089456 A1 * | 4/2010 | Lowery | | G05D 7/0106 |
| | | | | 137/486 |
| 2010/0218838 A1 | 9/2010 | Manahan | | |
| 2015/0211902 A1 | 7/2015 | Fink | | |
| 2016/0187179 A1 * | 6/2016 | Hrncir | | G01F 23/284 |
| | | | | 73/304 C |
| 2018/0094964 A1 * | 4/2018 | Eriksson | | H03L 7/18 |
| 2023/0126275 A1 * | 4/2023 | Warner | | H02K 5/136 |
| | | | | 431/76 |

OTHER PUBLICATIONS

PCT International Search Report and Written Opinion, Application No. PCT/CN2021/110618, dated Apr. 25, 2022, 10 pps.

* cited by examiner

ASSEMBLIES, CIRCUITS, AND METHODS OF TRANSMITTERS BETWEEN DIFFERENT EQUIPMENT PROTECTION LEVELS IN A HAZARDOUS ENVIRONMENT

CROSS REFERENCE TO RELATED APPLICATIONS

This patent application is a National Stage Entry of PCT/CN2021/110618 filed on Aug. 4, 2021, the disclosure of which is incorporated by reference herein in its entirety as part of the present application.

BACKGROUND

The field of the disclosure relates generally to assemblies, circuits, and methods of transmitters, and more particularly, to assemblies, circuits, and methods of transmitters between different equipment protection levels in a hazardous environment.

Transmitters are used to measure physical parameters such as liquid levels and pressure. When used in a hazardous environment, the transmitters must meet requirements for those environments. Conventional explosion proof or flame proof transmitters are limited to rigid probes of certain form factors, imposing constraints on transmitters that can be used in hazardous environments, especially between different equipment protection levels in a hazardous environment. Improvements are desired.

BRIEF DESCRIPTION

One aspect of the present disclosure provides a transmitter assembly for a hazardous environment. The transmitter assembly includes a transmitter and a probe. The transmitter includes a transmitting unit configured to be positioned in a first area of the hazardous environment, wherein the transmitting unit includes an intrinsically safe circuit. The probe is coupled with the transmitting unit and configured to be positioned in a second area of the hazardous environment, wherein the second area is more hazardous and has a higher equipment protection level than the first area, wherein the probe is electrically connected directly or indirectly to the intrinsically safe circuit. The separation assembly is positioned between the transmitting unit and the probe, the separation assembly including a hermetic seal configured to be electrically connected to the transmitting unit and the probe and a nut defining a tunnel sized to receive the hermetic seal therein, wherein the nut has an exterior surface and exterior threads formed on the exterior surface. The exterior threads of the nut are complementary to threads on a partition wall positioned between the transmitting unit and the probe.

Another aspect of the present disclosure provides a separation assembly of a transmitter assembly for a hazardous environment. The transmitter assembly includes an intrinsically safe circuit. The separation assembly includes a hermetic seal configured to be electrically connected to a transmitting unit and a probe of the transmitter assembly and a nut defining a tunnel sized to receive the hermetic seal therein, wherein the nut has an exterior surface and exterior threads formed on the exterior surface. The exterior threads of the nut are complementary to threads on a partition wall positioned between the transmitting unit and the probe.

One more aspect of the present disclosure provides a method of installing a separation assembly of a transmitter assembly between different equipment protection levels in a hazardous environment. The transmitter assembly includes an intrinsically safe circuit. The method includes providing a hermetic seal and a nut, wherein the hermetic seal is configured to be electrically connected to a transmitting unit and a probe of the transmitter assembly, and the nut defines a tunnel sized to receive the hermetic seal therein. The nut has an exterior surface and exterior threads formed on the exterior surface, and the exterior threads of the nut are complementary to threads on a partition wall positioned between the transmitting unit and the probe. The method further includes coupling the probe with the hermetic seal, coupling the hermetic seal with the nut, and engaging a seal wrench with the hermetic seal. The method also includes engaging a socket wrench with the nut and rotating the nut via the socket wrench while holding the hermetic seal stationary via the seal wrench.

BRIEF DESCRIPTION OF THE DRAWINGS

FIG. 5A shows connectors of a probe being retrieved in preparation for installing a separation assembly.

FIG. 5B shows the connectors after the connectors were retrieved.

FIG. 5C shows a hermetic seal connected to the connectors.

FIG. 5D shows a nut coupled to the hermetic seal.

FIG. 5E shows a seal wrench engaged with the hermetic seal and a socket wrench is engaged with the nut.

FIG. 5F shows the separation assembly after the separation assembly has been installed.

DETAILED DESCRIPTION

Figure 1A:
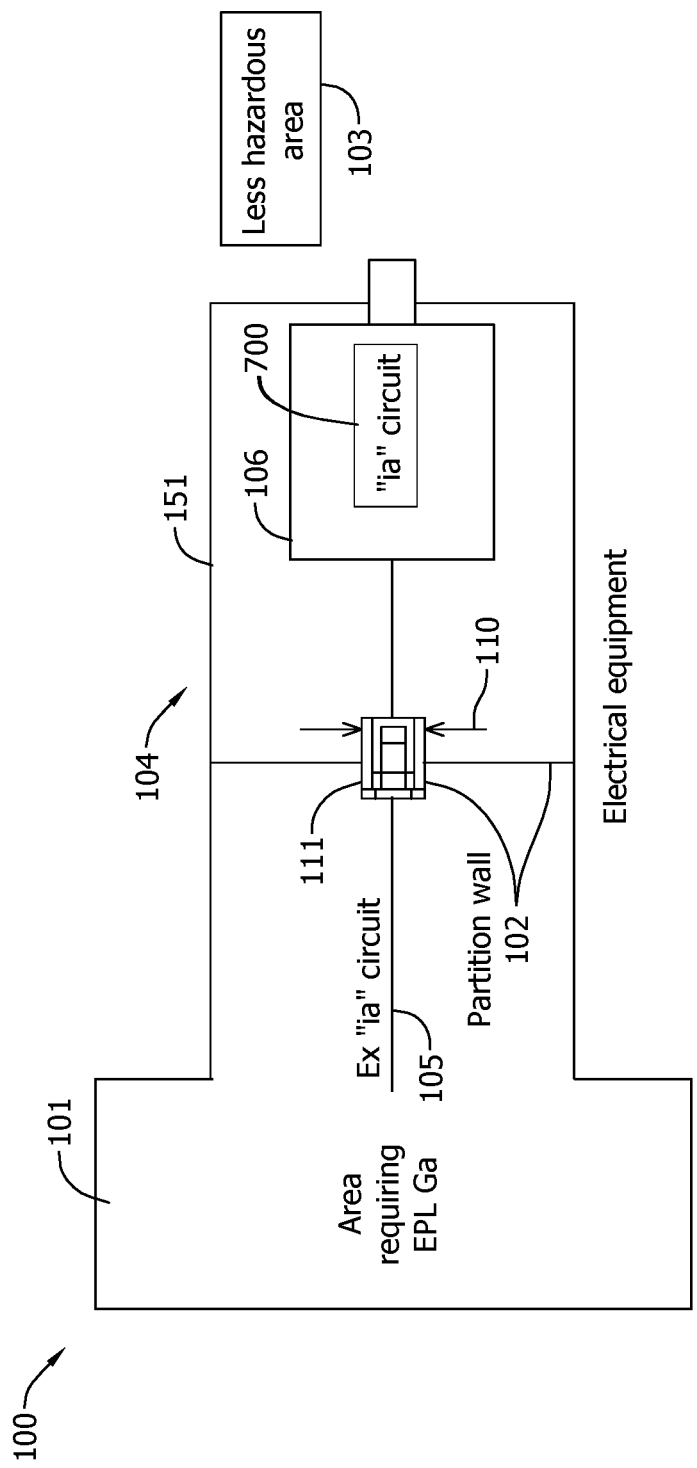
FIG. 1A is a schematic diagram of an exemplary transmitter assembly.

The disclosure includes assemblies, circuits, and methods of transmitters between different equipment protection levels (EPLs) in a hazardous environment. A separation assembly located in a generally hazardous environment is used to limit energy entering from a less hazardous area into a more hazardous area, as well as providing electrical and mechanical connections between components of the transmitter in different EPLs. The energy entering into a more hazardous area is further limited by including an intrinsically safe circuit in the transmitter. Method aspects will be in part apparent and in part explicitly discussed in the following description.

In order to understand the inventive concepts described herein to their fullest extent, some discussion of the state of the art and certain problems concerning transmitters for a hazardous environment is set forth below, followed by exemplary embodiments of overcoming such problems in the art.

Various types of transmitters such as magnetostrictive level transmitters have been developed for numerous types of commercial and industrial environments. More specifically, magnetostrictive level transmitters have been developed for measuring a liquid level in an oil tank in hazardous environments, where the tank is designed to be explosion-protected.

A transmitter that operates within hazardous environments present a risk of explosion via ignition of a surrounding gas or vapor dusts, fibers, or flyings. Such hazardous environments may arise, for example only, in petroleum refineries, petrochemical plants, grain silos, wastewater, and/or treatment facilities among other industrial facilities, where volatile conditions are produced in the ambient environment and present a heightened risk of fire or explosion. An occasional or continuous presence of airborne ignitable gas, ignitable vapors or dust, or otherwise flammable substances presents substantial concerns regarding safe and reliable operation of such facilities overall, including, but not limited to, safe operation of the transmitter such as containing sparks within the transmitters to prevent possible fire or explosion. As such, a number of standards have been promulgated relating to electrical products used in explosive environments to improve safety in hazardous locations in view of an assessed probability of explosion or fire risk.

For example, Underwriter's Laboratories ("UL") standard UL 1203 sets forth Explosion-Proof and Dust-Ignition-Proof Electrical Equipment criteria for hazardous locations. Electrical equipment manufacturers may receive UL certification of compliance with the applicable rating standards for hazardous locations, and UL certification is an important aspect of a manufacturer's ability to successfully bring products to market in North America or any other market accepting UL standard 1203.

The National Electric Code (NEC) generally classifies hazardous locations by class and division. Class 1 locations are those in which flammable vapors and gases may be present. Class II locations are those in which combustible dust may be found. Class III locations are those which are hazardous because of the presence of easily ignitable fibers or flyings. Considering Class 1, Division 1 covers locations where flammable gases or vapors may exist under normal operating conditions or under frequent repair or maintenance operations, or where breakdown or faulty operation of process equipment might also cause simultaneous failure of electrical equipment. Division 1 presents a greater risk of explosion than, for example, Division 2 where flammable gases or vapors are normally handled either in a closed system, confined within suitable enclosures, or are normally prevented by positive mechanical ventilation.

The International Electrotechnical Commission (IEC) likewise categorizes hazardous locations into Class I, Zone 0, 1, or 2 representing locations in which flammable gases or vapors are or may be airborne in an amount sufficient to produce explosive or ignitable mixtures. As defined by the IEC, a Class I, Zone 0 location is a location in which ignitable concentrations of flammable gases or vapors are present continuously or for long periods of time. A Class I, Zone 1 location is a location in which ignitable concentrations of flammable gases or vapors are likely to exist because of repair or maintenance operations or because of leakage or possible release of ignitable concentrations of flammable gases or vapors, or is a location that is adjacent to a Class I, Zone 0 location from which ignitable concentrations of vapors could be communicated.

IEC 60079 specifies requirements for constructing, testing, and marking Ex (explosion protected) equipment, where different parts of the equipment are positioned in areas of different hazardousness levels and therefore have different equipment protection levels (EPLs). A separation assembly mounted across a boundary across different EPLs is required, such as between different gas hazardous areas, dust hazardous areas, or gas hazardous areas adjacent to dust hazardous areas. For example, for equipment installed in the wall of storage tanks located in Zone 1 and containing Zone 0 inside, a separation assembly is required to be installed between Zones 1 and 0.

Conventional explosion proof or flame proof transmitters between different EPLs are limited to rigid probes of certain form factors. That is, changes in form factors or materials of the probes would require complete design changes for the transmitters to be used between different EPLs in a hazardous environment.

The assemblies and methods disclosed herein accordingly provide transmitter assemblies and separation assemblies meeting the requirements for hazardous environments, as well as safe, reliable installation of the transmitter assemblies and separation assemblies. Further, the transmitter assemblies, separation assemblies, and installation methods disclosed herein are not limited to transmitter assemblies having rigid probes of certain form factor, but can be used for any transmitters, thereby reducing cost and labor in installation, upgrading, and maintenance.

A magnetostrictive level transmitter is described herein for illustration purposes only. The assemblies, circuits, and methods described herein may be applied to any transmitters having a transmitter and installed between different EPLs in a hazardous environment. Method aspects will be in part apparent and in part explicitly discussed in the following description.

Figure 1B:
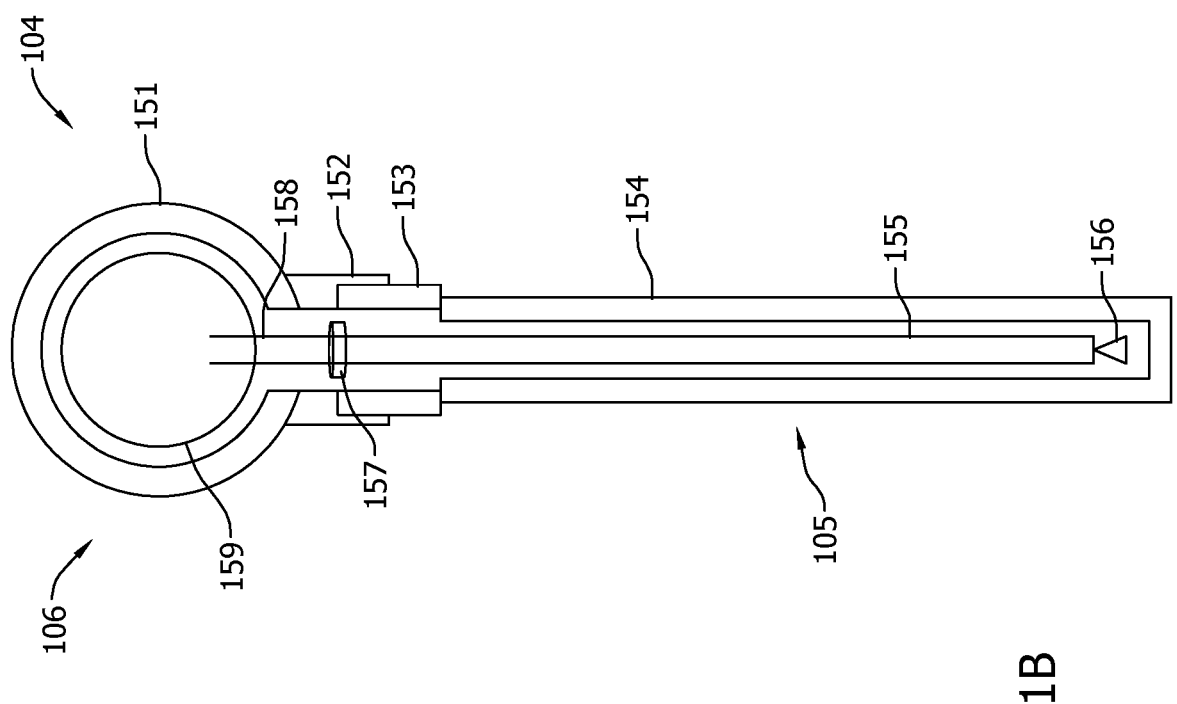
FIG. 1B is a transmitter of the transmitter assembly shown in FIG. 1A.

FIG. 1A is a block diagram of exemplary transmitter assembly 100 that is installed in areas having different EPLs. FIG. 1B is a schematic diagram of transmitter 104 of transmitter assembly 100.

In the exemplary embodiment, transmitter 104 is a magnetostrictive level transmitter (as shown in FIG. 1B). Transmitter 104 is used to measure physical parameters, such as liquid levels. Transmitter 104 includes probe 105 and transmitting unit 106. The signals from probe 105 are transmitted to the transmitting unit 106 for processing and transmission to a control system (not shown) and/or downstream devices. Transmitting unit 106 includes electronic board 159 that is configured to perform the functions of transmitting unit 106. Electronic board 159 is enclosed in enclosure 151. Enclosure 151 is attached to sensor adapter 153 through port 152 on enclosure 151. Sensor adapter 153 is attached to transmitter tube 154. Sensor adapter 153 and transmitter tube 154 conform with a body of probe 105 and form an enclosure that holds sensor wiring 155, sensor 157 such as a magnetostrictive sensor, and mechanical support 156. Signals detected by sensor 157 are transmitted to transmitting unit 106 through connectors 158.

In operation, magnetostrictive transmitter 104 is built by suspending the ferromagnetic metal wire or sensor wiring 155 inside long probe 105. Electronics in sensor 157 generate an electrical pulse that travels down the wire, at regular intervals, which creates a first magnetic field. A second magnetic field is created inside a float that moves up and down probe 105 with the liquid level and contains a magnet. When the electrical pulse reaches the float, the two magnetic fields collide, sensor wiring 155 inside probe 105 twists, and a vibration is propagated along the wire. The vibration is used to determining the liquid level because the vibration travels at a known speed, and therefore can be timed to measure the distance from sensor 157 to the float at the surface of the liquid, and back again. Signals representing liquid levels are transmitted to electronic board 159, which processes the signals and transmits out the signals using protocols such as Modbus communication protocols, 4-20 mA communication protocols where the signals are electrical current in the range of 4-20 mA, or digital communication protocols. Magnetostrictive level transmitters are relatively accurate and durable.

In the exemplary embodiment, transmitter assembly 100 and its installations comply with standards such as IEC 60079. Transmitter 104 of transmitter assembly 100 is installed in areas having different EPLs (as shown in FIG. 1A). For example, probe 105 of transmitter 104 is positioned in area 101 requiring EPL Ga while transmitting unit 106 of transmitter 104 is installed in less hazardous area 103 than area 101. Partition wall 102 limits the volume of enclosure 151 that houses transmitting unit 106 of transmitter 104. Partition wall 102 has a threaded opening that enable the electrical connection between transmitting unit 106 in enclosure 151 and probe 105. Transmitter assembly 100 includes separation assembly 111 installed between areas 101, 103 having different EPLs and coupled to partition wall 102. Separation assembly 111 keeps transmitter 104 explosion or flame proof using a hermetic seal and channels energy limited by transmitting unit 106 into probe 105 without compromising the explosion proof or flame proof characteristic of enclosure 151. The transmitting unit 106 also includes an intrinsically safe circuit 700 (see intrinsically safe circuits 700-1, 700-2, and 700-3 described later in FIGS. 7-12 and collectively referred to as intrinsically safe circuits 700) that couples with the probe 105 and the separation assembly 111 and further limits the amount of energy that enters through the seal to the more hazardous area 101. An intrinsically safe circuit may also be referred to as an "ia" circuit. The transmitting unit 106 may further include a circuit that does not meet the standards for an intrinsically safe circuit and may be referred to as a non-"ia" circuit. Probe 105 may be electrically connected directly to intrinsically safe circuit 700. Alternatively, probe 105 is electrically connected indirectly to intrinsically safe circuit 700, where the output from intrinsically safe circuit 700 is provided to other components of the transmitting unit 106, which are electrically connected directly to probe 105 (see FIGS. 7, 8, and 10-12 described later). The advantage of the latter approach is that redesigning transmitting unit 106, a costly and cumbersome process, is not needed in order to limit energy entering into probe 105 and to comply with standards for hazardous locations. The combination of a seal at the partition wall and an intrinsically safe circuit for limiting energy of signals entering through the seal may be referred to as flame proof with intrinsically safe output or Ex d ia.

Meeting the safety requirements for hazardous environments by installing a separation assembly between areas having different EPLs is challenging for several reasons. Welding separation assembly 111 to partition wall 102 in the field is not an option in a hazardous environment due to fire and explosion risks. Welding in the factory presents other challenges such as transportation and refitting. Separation assembly 111 is instead threaded to partition wall 102. Access to the partition wall 102 from the more hazardous area 101 is typically not possible. The only access is from less hazardous area 103. Further, standards such as ISO 965-1 and ISO 965-3 require a minimum number of turns, e.g., 5 to 7 turns, of threads to securely and effectively couple the seal of separation assembly 111 with the partition wall. The seal, however, is connected to electrical connectors, which have wires and are used to carry electrical signals. Turning the seals by 5 to 7 turns will twist the wires or even damage the connections, which may cause sparks in more hazardous area 101, posing fire or explosion risks during operation.

Figure 2:
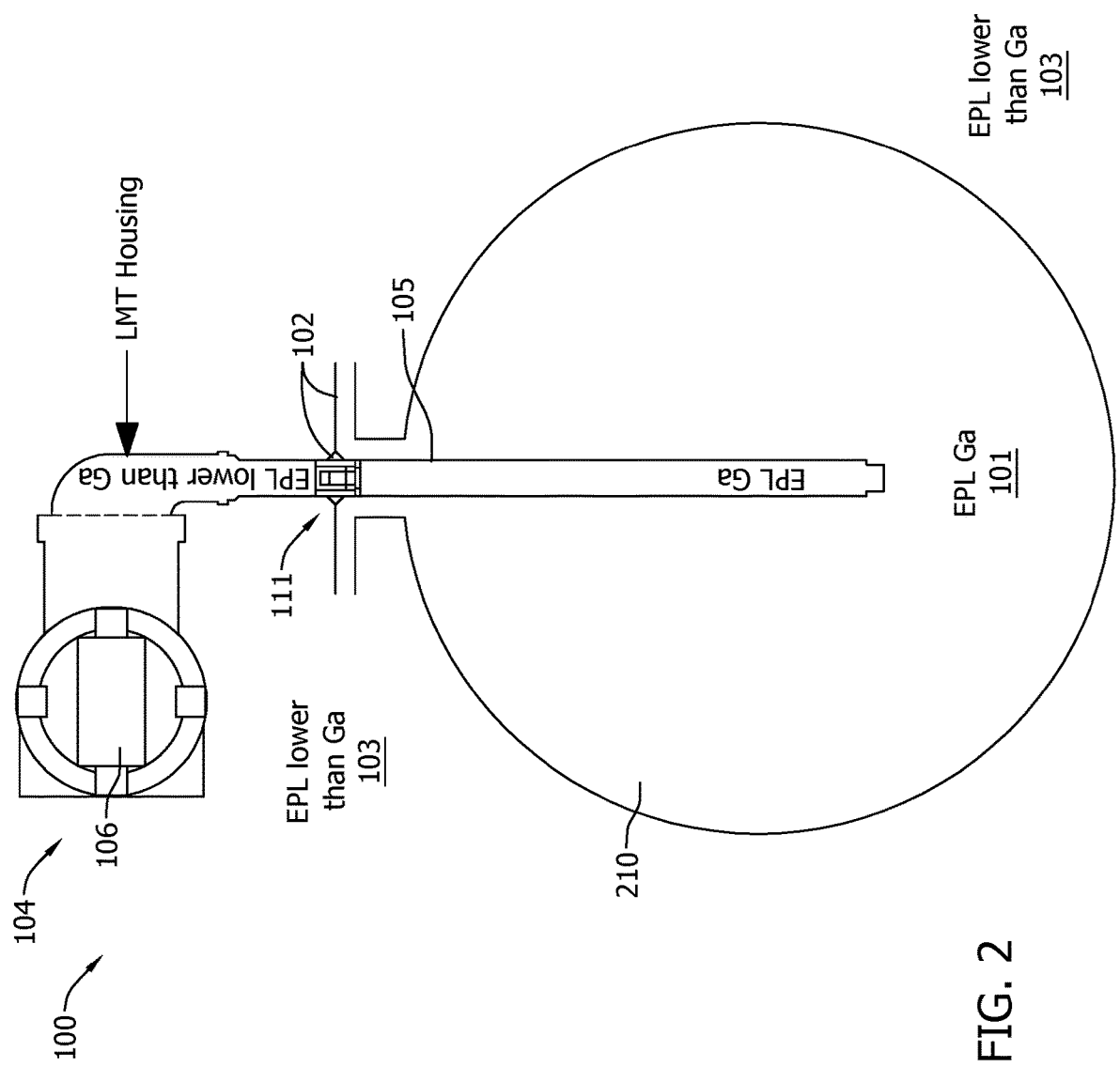
FIG. 2 is a schematic diagram of the transmitter assembly shown in FIG. 1A installed between areas having different equipment protection levels (EPLs).

FIG. 2 shows exemplary transmitter assembly 100 and exemplary separation assembly 111 that overcome the above described problems. FIG. 2 is a schematic diagram of transmitter assembly 100 being installed in a hazardous environment having different EPLs. The depiction in FIG. 2 is not to scale.

In the exemplary embodiment, transmitter assembly 100 includes transmitter 104 and separation assembly 111. Transmitter 104 includes transmitting unit 106 and probe 105. Transmitter 104 may be a magnetostrictive level transmitter that is used to measure liquid levels in oil tank 210. Transmitter 104 is installed on the oil tank 210 such that the probe 105 is inside the oil tank 210, a more hazardous area 101, while transmitting unit 106 is positioned in area 103 that is less hazardous than oil tank 210. Outside area 103 may still be in a hazardous environment such as petroleum refineries and petrochemical plants, but has a lower EPL than area 101. For example, oil tank 210 has an EPL Ga, which is for equipment in explosive atmospheres due to presence of gas, with a level of protection very high, while outside area 103 has an EPL Gb, which is for equipment for use in explosive atmospheres due to the presence of gas, with a high level of protection.

To meet the requirements for a hazardous environment having different EPLs, partition wall 102 is required at the border between outside area 103 and oil tank 210, as well as around probe 105. The probe part of this requirement may be met if the probe is rigid, where the probe itself is a partition wall. A new rigid probe with a form factor different from probes already certified could not be used in a hazardous area until the new rigid probe is evaluated and certified by a certification body. Further, probes 105 typically are relatively long, for example, having a length of 25 m (75 feet). Transporting a rigid probe of such a length is inconvenient. Probes 105 therefore are flexible such that probes 105 may be rolled up during transportation to installation sites and be rolled out during installation. In some embodiments, flexible probe 105 includes a housing fabricated from thermoplastic or other flexible membranes. Flexible probes 105, however, do not meet the partition wall requirement. Including separation assembly 111 in transmitter assembly 100 provides flexibilities in having probes of various form factors or having rigid or flexible housing.

To meet the requirements and accommodate flexible probes 105, separation assembly 111 is used. Separation assembly 111 facilitates electrical and mechanic connections between transmitting unit 106 and probe 105 and serves to seal transmitting unit 106 from more hazardous area 210 such that energy that passes through separation assembly 111 is limited to the level allowed by more hazardous area 101, such as at EPL Ga.

Figure 3A:
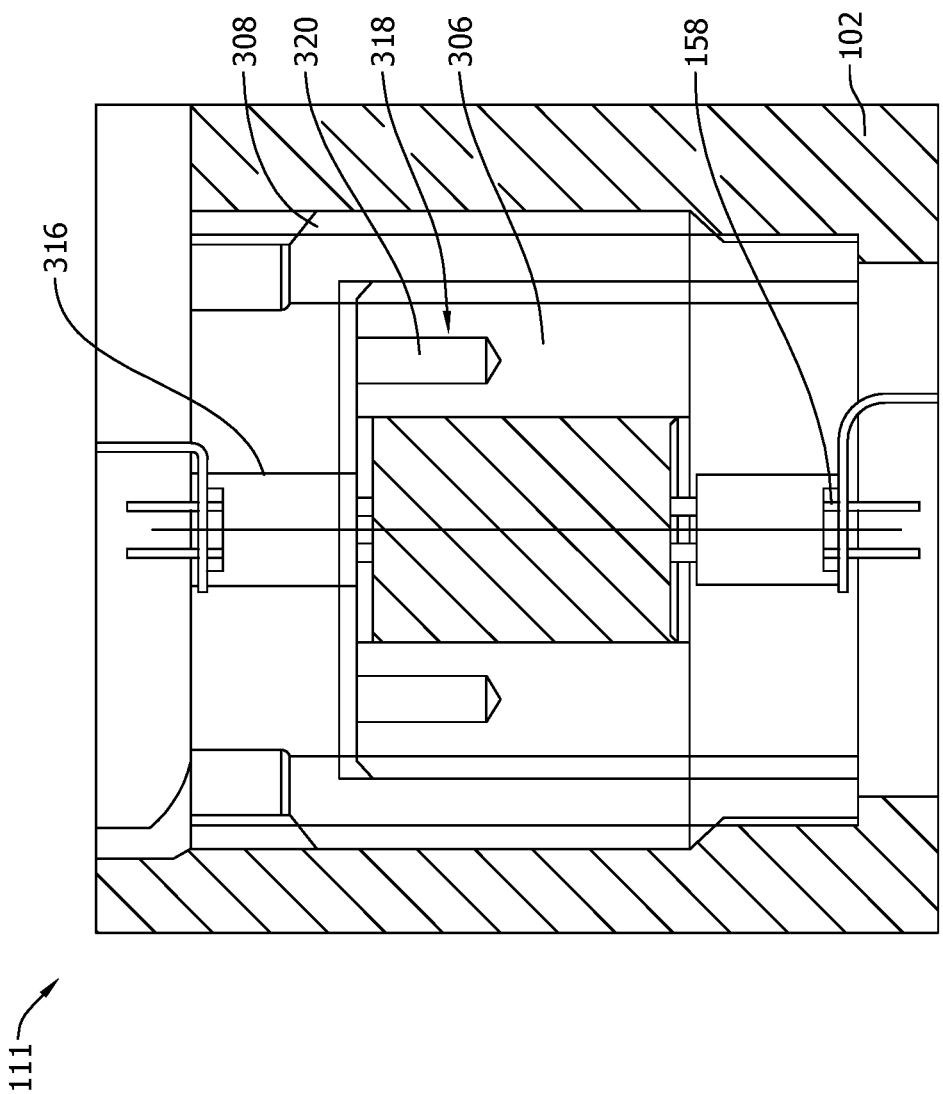
FIG. 3A is a cross-sectional view of an exemplary separation assembly of the transmitter assembly shown in FIG. 2, with the separation assembly being coupled to a partition wall.
Figure 3B:
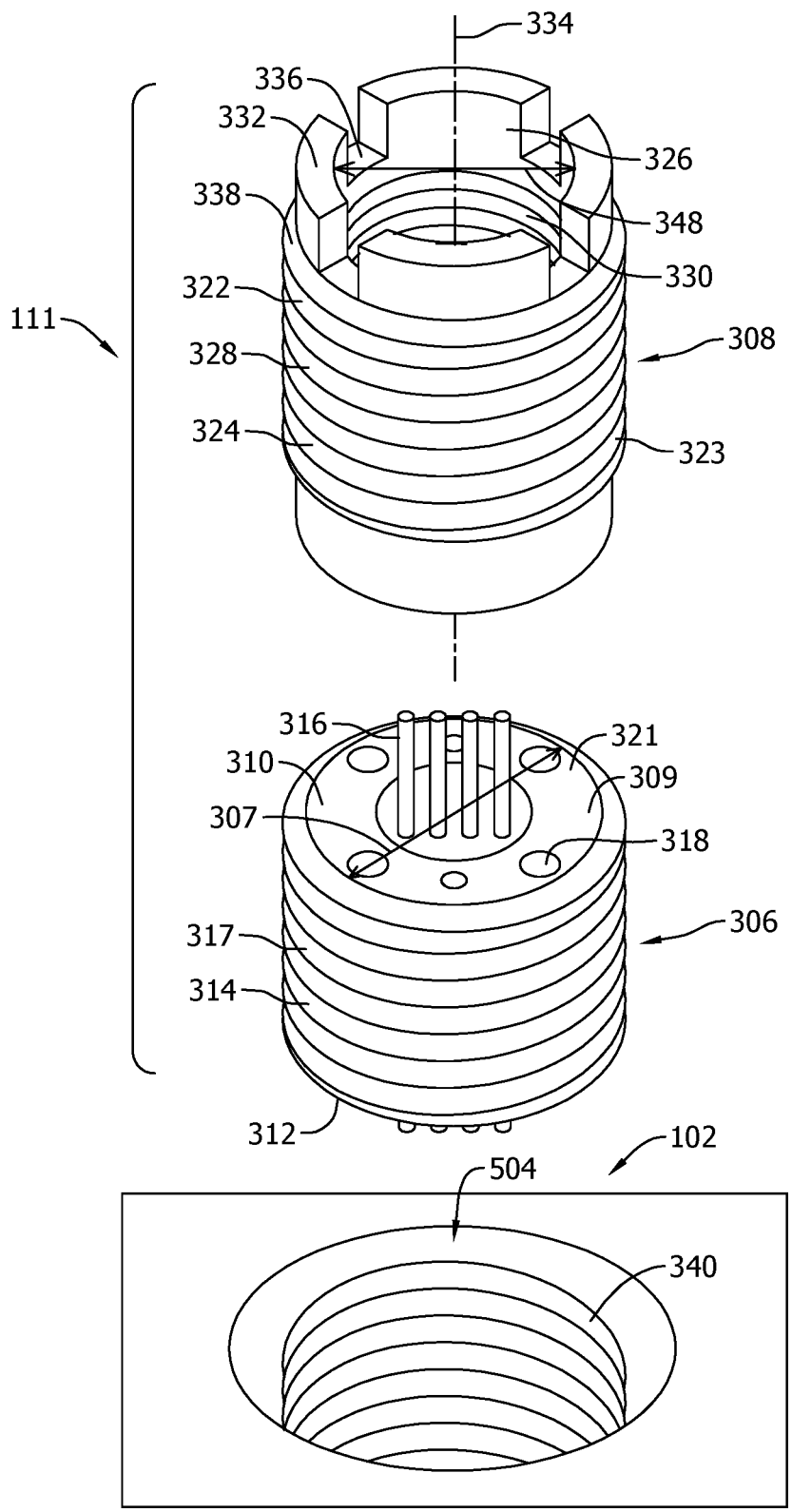
FIG. 3B is an exploded view of the separation assembly shown in FIG. 3A.
Figure 3C:
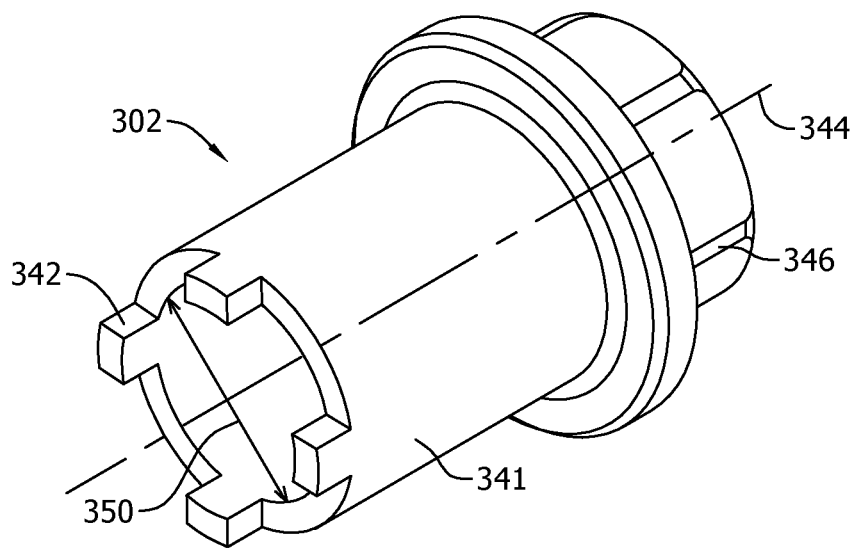
FIG. 3C is a perspective view of an exemplary socket wrench for installing the separation assembly shown in FIG. 3A.
Figure 3D:
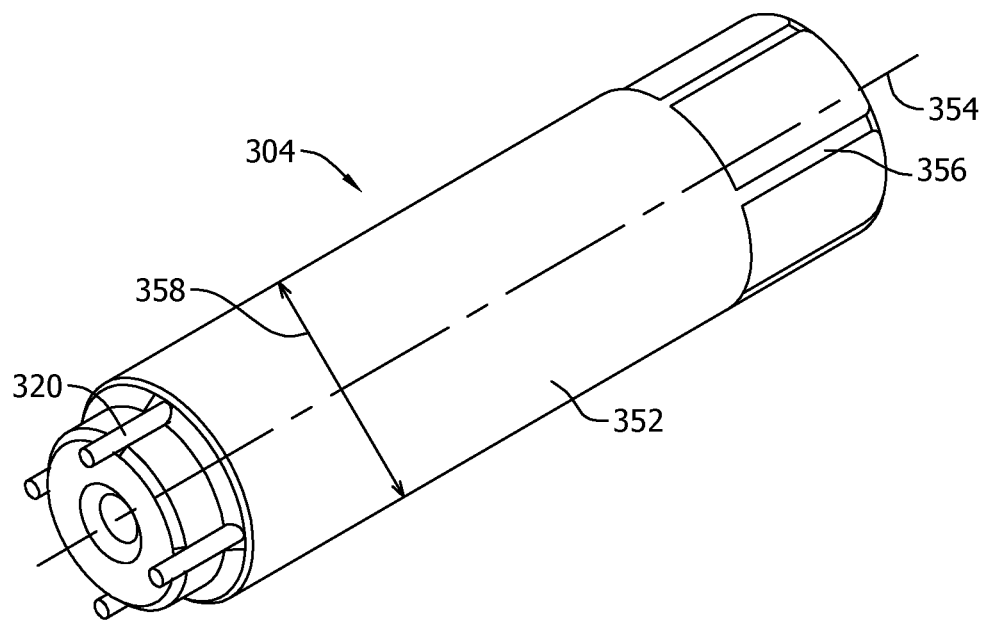
FIG. 3D is a perspective view of an exemplary seal wrench for installing the separation assembly shown in FIG. 3A.

FIGS. 3A-3D show exemplary separation assembly 111. FIG. 3A is a cross-sectional view of separation assembly 111 as assembled with partition wall 102. FIG. 3B is an exploded view of separation assembly 111. FIG. 3C is a perspective view of socket wrench 302. FIG. 3D is a perspective view of seal wrench 304. Socket wrench 302 and seal wrench 304 are used to facilitate installation of separation assembly 111.

In the exemplary embodiment, separation assembly 111 includes hermetic seal 306 and nut 308 (FIG. 3B). Hermetic seal 306 has a generally cylindrical seal body 309. Hermetic seal 306 may have a diameter 307 of 12 mm-13 mm. Hermetic seal 306 includes top surface 310, bottom surface 312 opposite top surface 310, and side surface 314 extending between top surface 310 and bottom surface 312. Bottom surface 312 includes connectors (not shown) sized to couple with connectors 158 from probe 105 (see FIG. 1B and FIGS. 5A-5C described later). Exterior threads 317 are formed along side surface 314. Top surface 310 includes connectors 316 that provide electrical and mechanical connection with transmitting unit 106. In the depicted embodiment, connectors 316 are pins. Alternatively, the connectors may be sockets for receiving connectors from the transmitting unit 106. Top surface 310 further includes a plurality of recesses 318 each sized to receive and engage with pins 320 of seal wrench 304 (as shown in FIGS. 3A and 3D). The recesses 318 may have a diameter of 1.2 mm. An increased number of recesses 318 provides increased coupling force between seal wrench 304 and hermetic seal 306. Recesses 318 may be evenly distributed along rim 321 on top surface 310.

In the exemplary embodiment, nut 308 includes cylindrical wall 322 that defines a hollow cylinder or tunnel 323 sized to telescopingly receive hermetic seal 306 therein (as shown in FIG. 3B). Cylindrical wall 322 includes exterior surface 324 and interior surface 326 opposite exterior surface 324. Cylindrical wall 322 includes exterior threads 328 along exterior surface 324 and interior threads 330 along interior surface 326. Interior threads 330 are complementary to exterior threads 317 of hermetic seal 306. That is, pitches and slopes of threads 317, 330 are approximately the same such that when hermetic seal 306 and nut 308 are rotated separately or are both rotated, hermetic seal 306 can be coupled with, or decoupled from the nut 308 as the seal and nut threads 317, 330 engage with or disengage from one another, and as a result hermetic seal 306 moves toward or away from the nut. The sloping directions of exterior threads 328 and interior threads 330 of nut 308, however, are opposite from one another and as a result the hermetic seal 306 may remain stationary while nut 308 is being rotated. Cylindrical wall 322 further includes a plurality of projections 332 extending parallel to longitudinal axis 334 of the cylindrical wall 322. Each pair of adjacent projections 332 define a like recess 336 therebetween. The projections 332 may be evenly distributed along rim 338. Exterior threads 328 of nut 308 are complementary to threads 340 of partition wall 102.

In the exemplary embodiment, socket wrench 302 is formed as a generally hollow cylinder 341 and open at both ends. The socket wrench 302 includes a plurality of feet 342 each sized to be received in one of recesses 336 of cylindrical wall 322 of nut 308 and engage projections 332. Feet 342 extend from one end of socket wrench 302 parallel to longitudinal axis 344. Feet 342 may be evenly distributed along the edge of cylindrical wall 322. As a result, the force applied by socket wrench 302 on nut 308 through the engagement between feet 342 and projections 332 is balanced. At the end of socket wrench 302 opposite the end that includes feet 342, a series of grooves 346 are provided. The grooves 346 increase the user's ability to grip the socket wrench 302. Diameter 350 of hollow cylinder 341 formed by socket wrench 302 is approximately the same as diameter 348 of hollow cylinder 323 of nut 308 such that socket wrench 302 can be fitted onto nut 308 with feet 342 of socket wrench 302 located in nut recesses 336.

In the exemplary embodiment, seal wrench 304 includes the plurality of pins 320 positioned at one end of seal wrench 304 and sized to be received in recesses 318 on top surface 310 of hermetic seal 306 and thereby engage with hermetic seal 306. Seal wrench 304 includes a generally cylindrical body 352. Body 352 may be hollow or solid, or have other interior structures. Pins 320 extend from one end of the seal wrench parallel to longitudinal axis 354 of body 352. The pins may be evenly distributed along an edge of the body 352. As a result, the force applied on hermetic seal 306 through the engagement of pins 320 in recesses 318 is balanced. At the end of body 352, opposite the body end that includes pins 320, seal wrench 304 may further include grooves 356 that enable the wrench user to increase the user's grip applied to the seal wrench. Diameter 358 of body 352 is approximately the same as diameter 307 of cylinder or cylindrical seal body 309 of hermetic seal 306 such that seal wrench 304 can be fitted onto hermetic seal 306 with pins 320 engaged in recesses 318 of hermetic seal 306. Socket wrench 302 is sized to permit the end of seal wrench 304 to be located within the interior of socket wrench 302 along axis 344.

In operation, once assembled, nut 308 is coupled to the partition wall 102 by coupling of exterior threads 328 of nut 308 with threads 340 of partition wall 102. Hermetic seal 306 is positioned inside nut 308 with interior threads 330 of nut 308 coupled and engaged with threads 317 of hermetic seal 306. The coupling and engagement of threads 317, 328, 330, and 340 are facilitated by seal wrench 304 and socket wrench 302, where socket wrench 302 rotates nut 308 while hermetic seal 306 is held stationary by seal wrench 304 during rotation of the nut 308.

Figure 4:
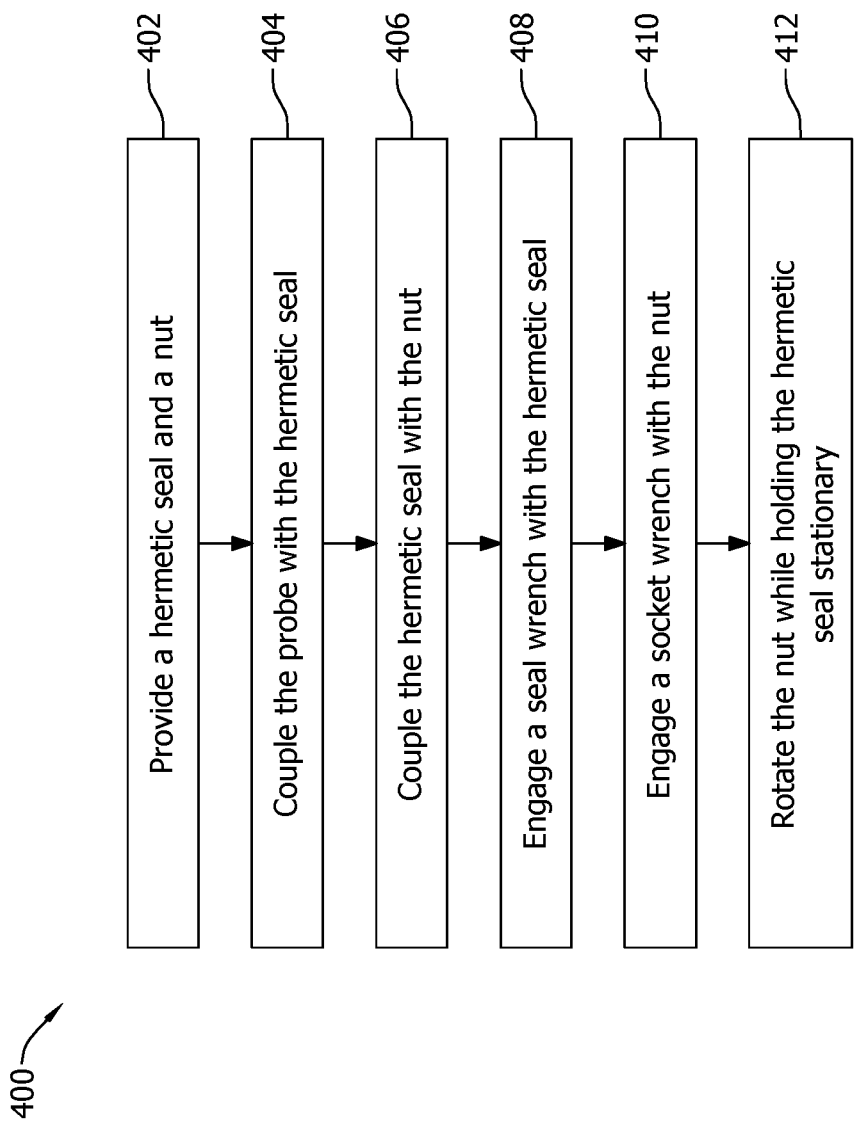
FIG. 4 is a flow chart of an exemplary method of installing a separation assembly of a transmitter assembly shown in FIGS. 1-3D.
Figure 5A:
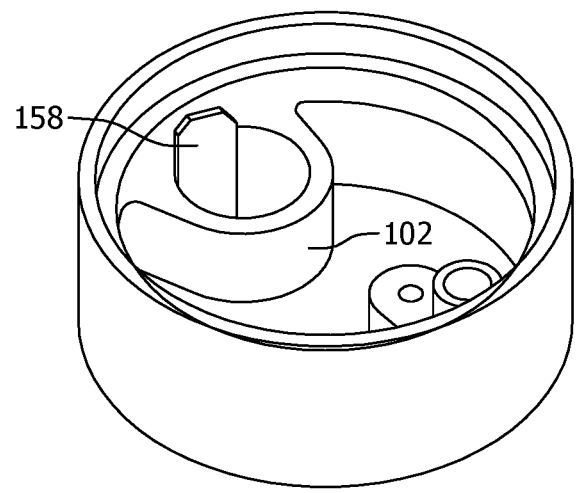
FIGS. 5A-5F are schematic diagrams illustrating the method shown in FIG. 4.
Figure 5B:
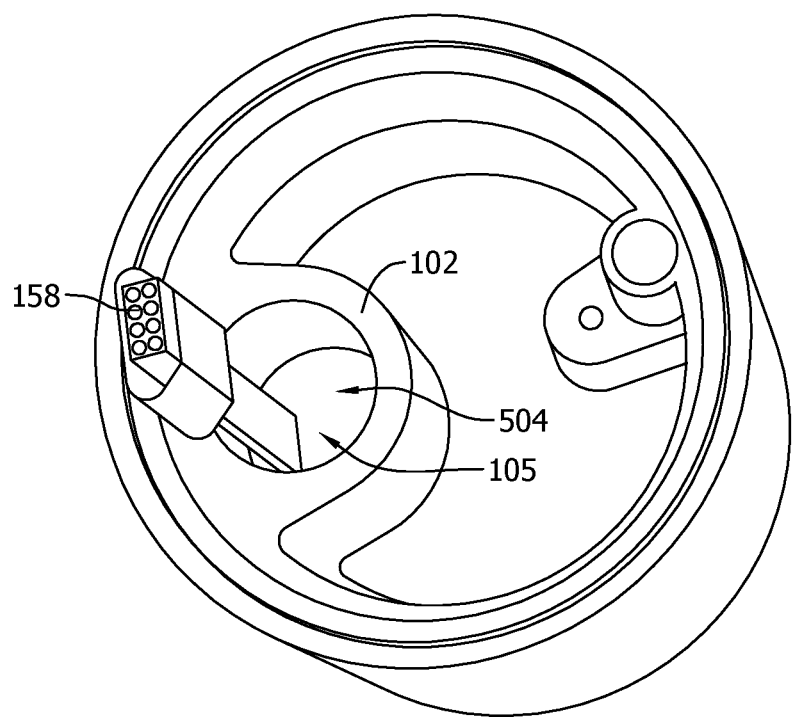
Figure 5C:
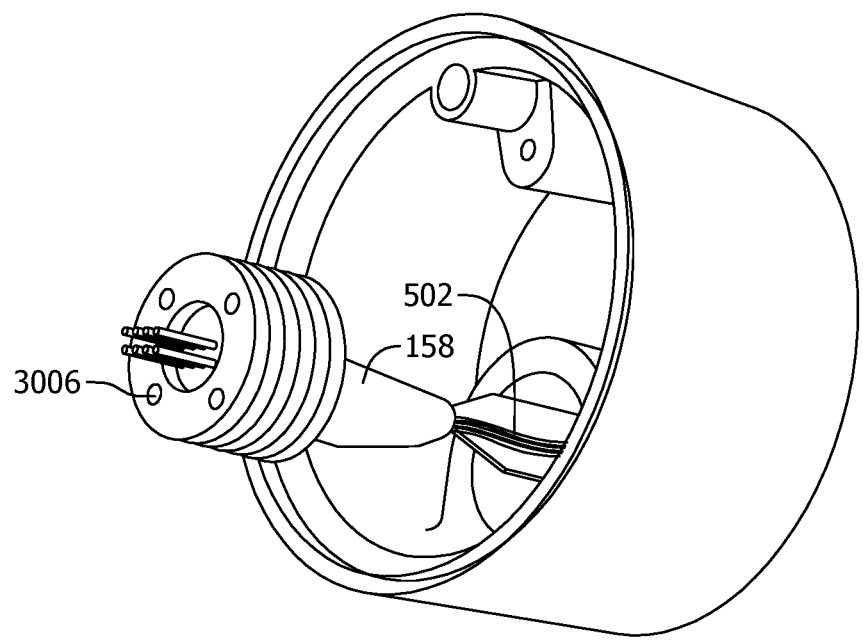
Figure 5D:
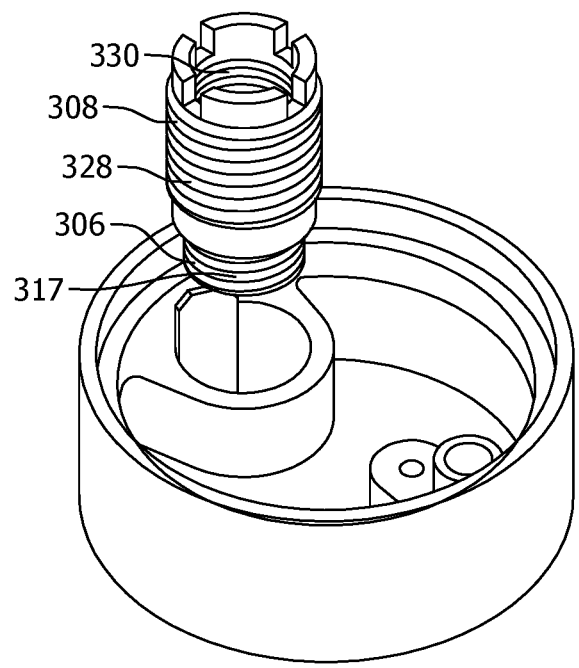
Figure 5E:
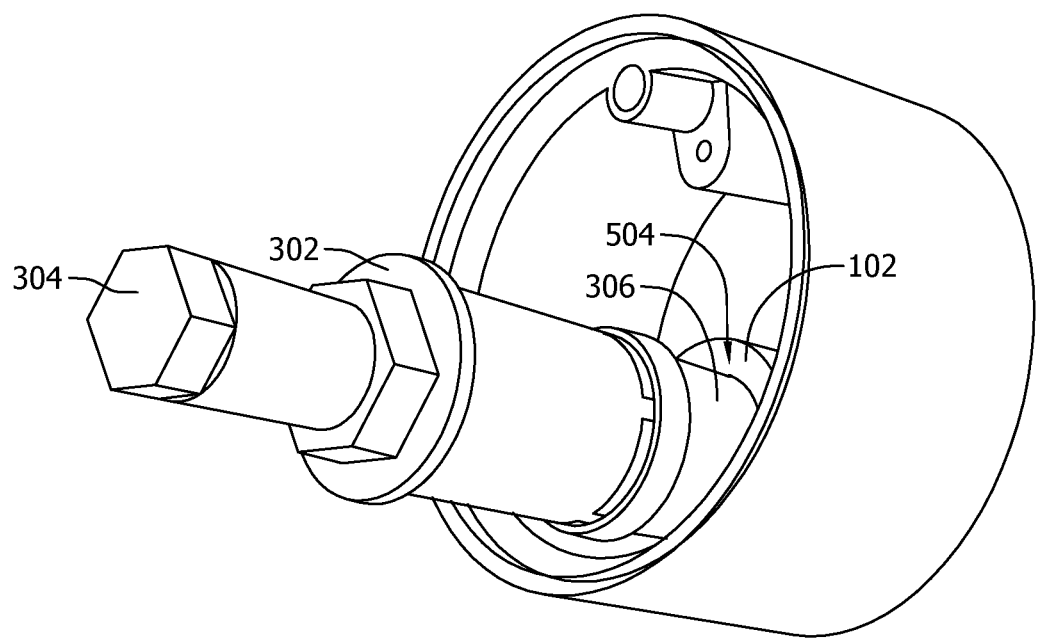
Figure 5F:
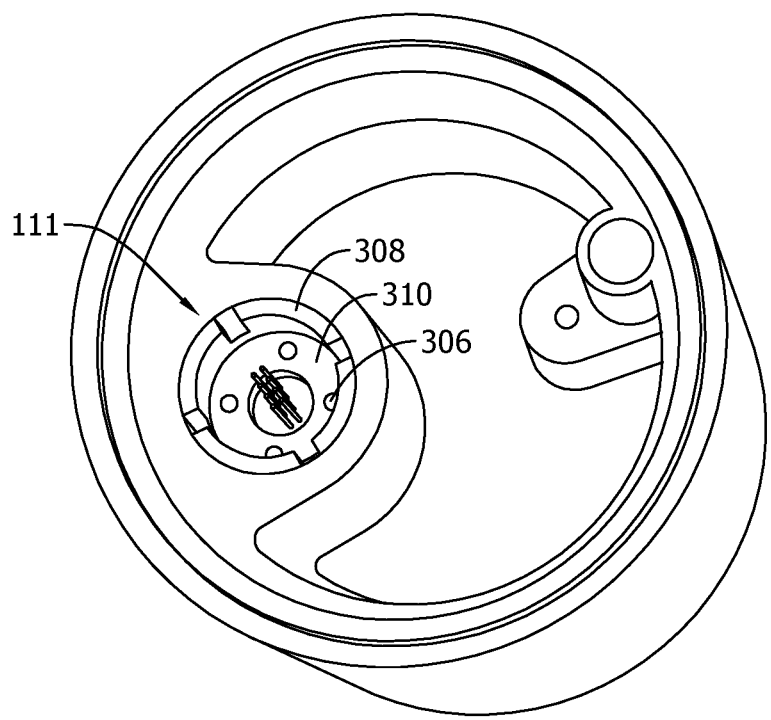

FIGS. 4-5F depict exemplary method 400 of installing the separate assembly of a transmitter assembly between different EPLs in a hazardous environment. FIG. 4 is a flow chart of method 400. FIGS. 5A-5F are schematic diagrams illustrating method 400.

In the exemplary embodiment, method 400 includes providing 402 a hermetic seal and a nut. The hermetic seal and the nut may be hermetic seal 306 and nut 308 described above, respectively. Method 400 includes coupling 404 the probe of the transmitter assembly with the hermetic seal. First, connectors 158 from probe 105 are retrieved (as shown in FIG. 5A) from the opening provided in partition wall 102. FIG. 5B shows the connectors 158 have been retrieved. Connectors 158 are then connected to hermetic seal 306 (as shown in FIG. 5C). Method 400 further includes coupling 406 the hermetic seal with the nut. Nut 308 is placed over the hermetic seal and is rotated with a few turns, e.g., one turn, such that nut 308 engages with the hermetic seal through nut interior threads 330 and hermetic seal exterior threads 317. During the rotation, hermetic seal 306 is held stationary to avoid the twisting of the connectors 158 and their associated wires 502 (as shown in FIG. 5C). Therefore, rotating one turn is desired such that only one pair of threads of threads 317, 330 are engaged with one another.

In the exemplary embodiment, method 400 further includes engaging 408 a seal wrench with the hermetic seal. Method 400 also includes engaging 410 a socket wrench with the nut. That is, seal wrench 304 is placed over and engages with hermetic seal 306, and socket wrench 302 is placed over and engages with nut 308 (as shown in FIG. 5D). Socket wrench 302 is slid along body 352 of seal wrench 304 until feet 342 are located in recesses 336 (see FIGS. 3A-3D). Alternatively, socket wrench 302 is placed over nut 308 first and then seal wrench 304 is inserted into body or hollow cylinder 341 of socket wrench 302 until pins 320 are received in recesses 318. Hermetic seal 306 and nut 308 are moved as a single unit into opening 504 of partition wall 102 (as shown in FIG. 5D, also see FIGS. 3B and 5B), with socket wrench 302 and seal wrench 304 engaged with nut 308 and hermetic seal 306, respectively. Method 400 also includes rotating 412 the nut while holding the hermetic seal stationary. With seal wrench 304 maintaining the hermetic seal stationary, socket wrench 302 is rotated about axis 344 until top exterior threads 328 of nut 308 are engaged with top threads 340 of partition wall 102 (as shown in FIG. 5E, also see FIGS. 3B and 5B). In some embodiments, after rotation is completed, only an end of nut 308 and top surface 310 of hermetic seal 306 are visible outside the partition wall 102. During the entire installation, the wires 502 of the connectors 158 are not twisted. As a result, separation assembly 111 is safely and reliably installed.

Referring back to FIG. 1A, transmitter assembly 100 includes intrinsically safe circuit 700 in transmitting unit 106 to limit the amount energy entering through separation assembly 111 to the level that complies with EPL requirements to more hazardous area 101. Intrinsically safe circuits are used together with loads operating in explosive atmospheres to prevent explosion by limiting the energy in the transmitter to a level below the energy level which may cause ignition by either sparking or heating effects.

Conventional intrinsically safe circuits, such as intrinsically safe barriers, are usually only designed for an energy delivering channel. For loads including an energy delivering channel and a signal transmitting channel, such as those conforming to a Modbus protocol, the conventional intrinsically safe circuits cannot limit the energy delivered in the signal transmitting channel or between the energy delivering channel and the signal transmitting channel. As a result, the conventional intrinsically safe circuits are no longer suitable for loads having a communication function. Thus, there is a need for an intrinsically safe circuit that limits the energy in a load that includes an energy delivering channel and a signal transmitting channel.

According to embodiments of the present disclosure, a voltage clamping unit and a current limiting unit are provided to any ports of the load so as to limit the energy output to the load. The above idea may be implemented in various manners, as will be described in detail in the following paragraphs.

Figure 6:
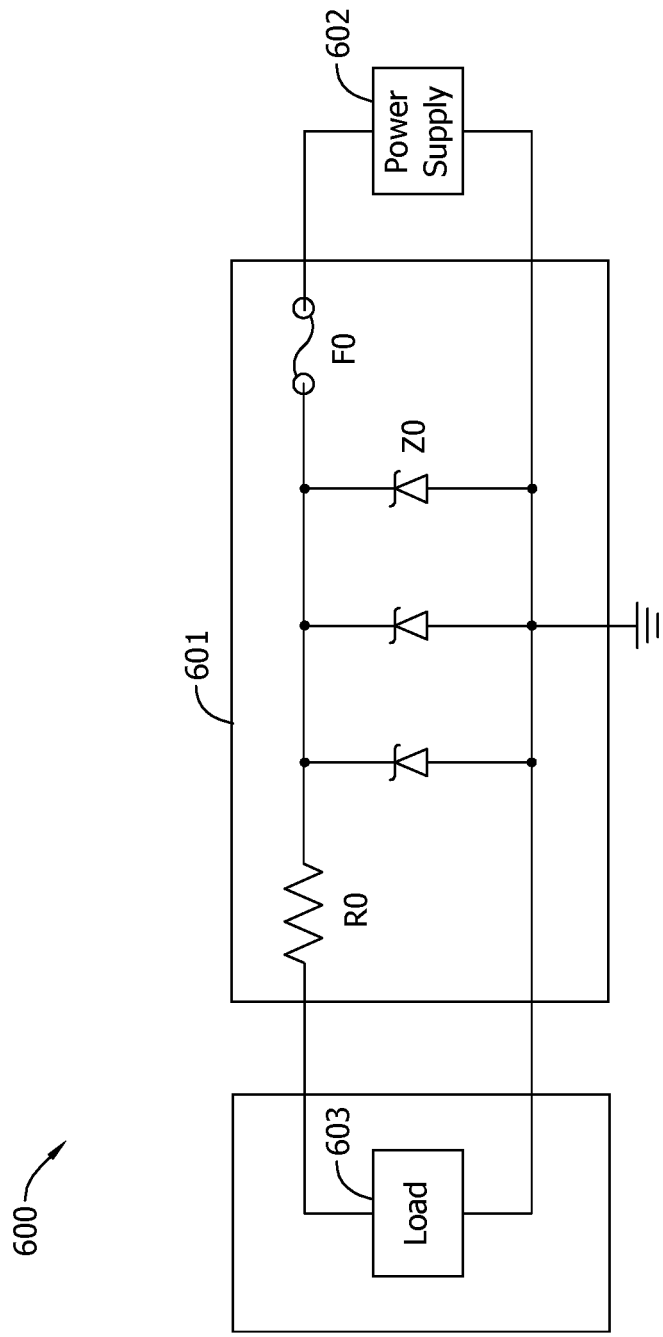
FIG. 6 is a circuit diagram of a known intrinsically safe barrier.

First, operational principles and problems of a conventional intrinsically safe circuit will be described in detail with reference to FIG. 6. FIG. 6 is a schematic view illustrating a working scenario of the conventional intrinsically safe circuit. As shown in FIG. 6, the intrinsically safe circuit is formed by intrinsically safe barrier 601. Intrinsically safe barrier 601 is connected between power supply 602 and load 603 (such as, transmitter 104) to limit energy delivered from power supply 602 to load 603.

As shown in FIG. 6, intrinsically safe barrier 601 includes fuse F0, three Zener diodes Z0, and resistor R0. Fuse F0 is used to prevent an overcurrent from flowing into load 603, and Zener diodes Z0 are used to clamp a voltage applied to load 603. When the current exceeds a predetermined current level, fuse F0 may be disconnected or opened, and the current provided to load 603 will become 0. When the voltage of power supply 602 exceeds a predetermined voltage level, Zener diodes Z0 are conducted, and the voltage applied to load 603 may be clamped to a breakdown voltage of Zener diodes Z0. By clamping the voltage and limiting the current, the energy delivered to load 603 may be limited.

When load 603 is a transmitter having a communication function (for example, a transmitter conforming to a Modbus protocol), load 603 usually includes an energy delivering channel, a signal transmitting channel, and at least four ports. Two ports are used for energy delivering, and two ports are used for signal transmitting. Normally, intrinsically safe barrier 601 is connected to the energy delivering ports of the transmitter. However, due to the number of the ports being more than two, intrinsically safe barrier 601 and the transmitter may be misconnected. In some situations, there is no voltage clamping unit or no current limiting unit. As a result, the misconnection can cause an over-voltage and/or over-current to occur. As a result, the transmitters with Modbus communication protocols may be explosion proof (XP) or flameproof (Exd), but are not intrinsically safe. Redesigning the transmitters to be intrinsically safe is typically expensive, not only due to the cost associated with design changes and also due to required test and validation assessments, supply chain development, and certification reviews.

Thus, there is a need for an intrinsically safe circuit that limits the energy in a load that includes an energy delivering channel and a signal transmitting channel, no matter how the load is connected to the intrinsically safe circuit.

Figure 7:
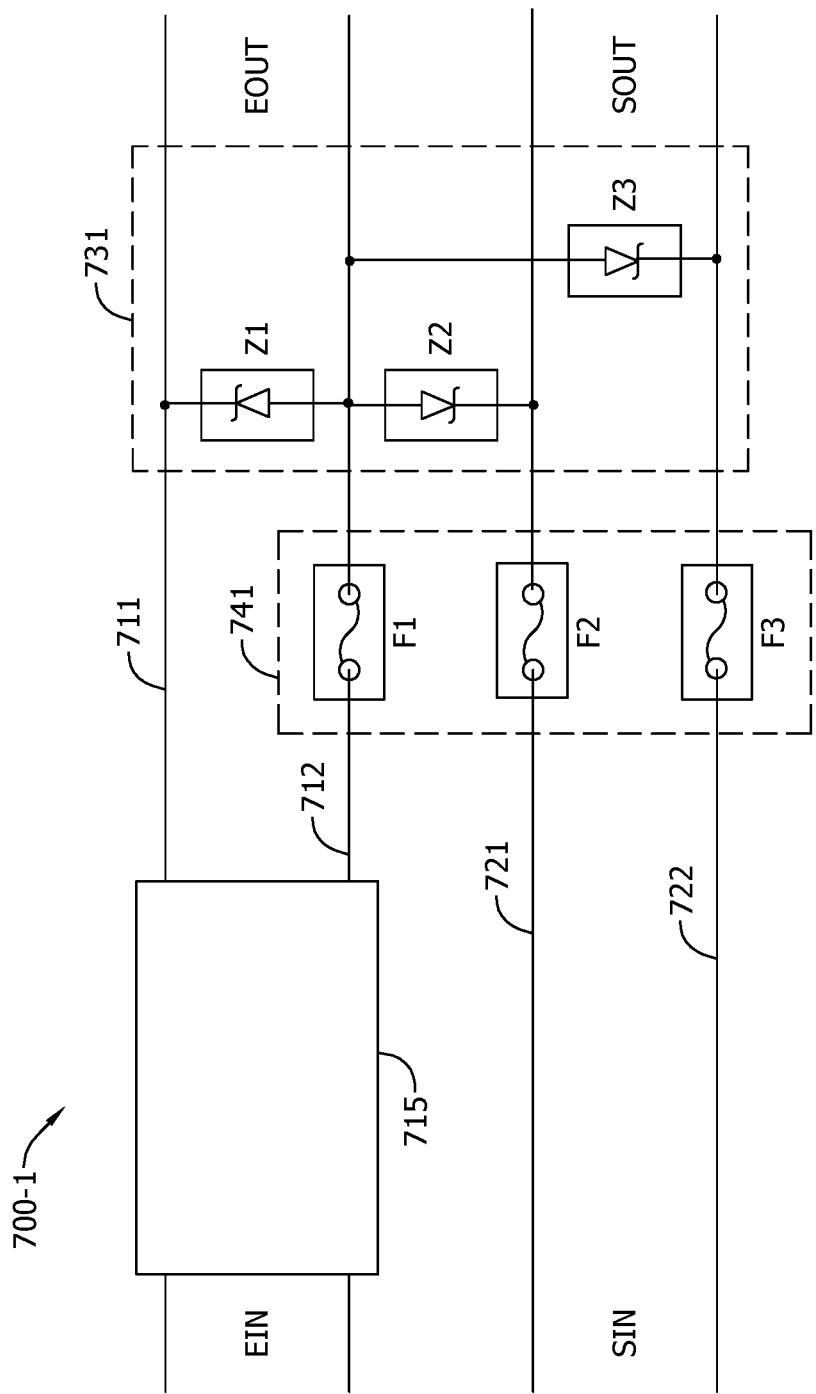
FIG. 7 is an exemplary intrinsically safe circuit for the transmitter assembly shown in FIG. 1A using a Modbus communication protocol.

Exemplary intrinsically safe circuit 700-1 is described below in detail with reference to FIGS. 7-9. Intrinsically safe circuit 700-1 is electrically connected to probe 105 such that the transmitter assembly is intrinsically safe, besides being XP or Exd. Intrinsically safe circuit 700-1 allows the use of intrinsically safe sensors with XP or Exd devices without the need for separate intrinsically safe wiring and separate intrinsically safe barriers, thereby reducing number of changes and the amount of effort associated with the development of circuit 700-1. Refer to FIG. 7 first. FIG. 7 is a schematic block diagram of intrinsically safe circuit 700-1 in accordance with an embodiment of the present disclosure. As shown in FIG. 7, intrinsically safe circuit 700-1 generally includes first power line 711, second power line 712, first signal line 721, second signal line 722, voltage clamping unit 731, and current limiting unit 741.

As shown in FIG. 7, first power line 711 and second power line 712 are connected in parallel between energy input ports EIN and energy output ports EOUT of intrinsically safe circuit 700-1 to deliver energy from energy input ports EIN to energy output ports EOUT.

In some embodiments, first power line 711 is a positive voltage line, and second power line 712 is a negative voltage line. In other embodiments, first power line 711 may be a negative voltage line, and second power line 712 may be a positive voltage line. The scope of the present disclosure is not intended to be limited in this respect.

As shown in FIG. 7, first signal line 721 and second signal line 722 are connected in parallel between signal input ports SIN and signal output ports SOUT of intrinsically safe circuit 700-1 to deliver signals between the signal input ports SIN and signal output ports SOUT.

In some embodiments, first signal line 721 and second signal line 722 are twisted-pair. In other embodiments, first signal line 721 and second signal line 722 may be other types of lines. The scope of the present disclosure is not intended to be limited in this respect.

As shown in FIG. 7, voltage clamping unit 731 is connected between first power line 711, second power line 712, first signal line 721, and second signal line 722. Voltage clamping unit 731 is used to clamp a voltage between any two of first power line 711, second power line 712, first signal line 721, and second signal line 722.

In some embodiments, voltage clamping unit 731 includes first Zener diode Z1, second Zener diode Z2, and third Zener diode Z3. An anode of first Zener diode Z1 is connected to second power line 712, and a cathode of first Zener diode Z1 is connected to first power line 711. An anode of second Zener diode Z2 is connected to second power line 712, and a cathode of second Zener diode Z2 is connected to first signal line 721. An anode of third Zener diode Z3 is connected to second power line 712, and a cathode of third Zener diode Z3 is connected to second signal line 722. In the exemplary embodiment, first power line 711 is a positive voltage line, and second power line 712 is a negative voltage line. In other embodiments, voltage clamping unit 731 may include other components. The scope of the present disclosure is not intended to be limited in this respect.

In some embodiments, the breakdown voltage of Zener diodes Z1-Z3 is 5 V. In other embodiments, the breakdown voltage of Zener diodes Z1-Z3 may be other values, for example, 10 V, 24 V. The scope of the present disclosure is not intended to be limited in this respect.

If a situation of over-voltage occurred between first power line 711 and second power line 712, first Zener diode Z1 is reverse conducted, and voltage applied to the load is clamped at the breakdown voltage of first Zener diode Z1. If a situation of over-voltage occurred between first power line 711 and first signal line 721, first Zener diode Z1 is reverse conducted, and the voltage applied to the load is clamped at a voltage equal to the breakdown voltage of first Zener diode Z1 plus a forward voltage of second Zener diode Z2. If a situation of over-voltage occurred between first power line 711 and second signal line 722, first Zener diode Z1 is reverse conducted, and the voltage applied to the load is clamped at a voltage equal to the breakdown voltage of first Zener diode Z1 plus a forward voltage of third Zener diode Z3. If a situation of over-voltage occurred between first signal line 721 and second signal line 722, second Zener diode Z2 is reverse conducted, and the voltage applied to the load is clamped at a voltage equal to the breakdown voltage of second Zener diode Z2 plus the forward voltage of third Zener diode Z3.

With the above arrangement, no matter how the load is connected to intrinsically safe circuit 700-1, the voltage applied to the load is always clamped when a situation of over-voltage occurs.

As shown in FIG. 7, current limiting unit 741 is connected in at least three of first power line 711, second power line 712, first signal line 721, and second signal line 722. Current limiting unit 741 is used to limit currents flowing through first power line 711, second power line 712, first signal line 721, and second signal line 722.

In some embodiments, current limiting unit 741 includes three fuses F1, F2, and F3. Fuse F1 is connected in second power line 712, fuse F2 is connected in first signal line 721, and fuse F3 is connected in second signal line 722. In other embodiments, current limiting unit 741 may include other components. The scope of the present disclosure is not intended to be limited in this respect.

In some embodiments, fusing current of fuses Z1-Z3 is 28 mA. In other embodiments, the fusing current of the fuses may be of other values, for example, 26 mA, 30 mA, 40 mA, 50 mA, 62 mA, 80 mA, or 100 mA. The scope of the present disclosure is not intended to be limited in this respect.

With the above arrangement, the currents flowing through any two of first power line 711, second power line 712, first signal line 721, and second signal line 722 are limited.

In some embodiments, intrinsically safe circuit 700-1 further includes voltage converter 715. Voltage converter 715 is connected between the energy input ports EIN and first and second power lines 711, 712. Voltage converter 715 is used to provide a regulated voltage suitable for the load, for example, a transmitter. Since the voltage is regulated, the chance that a situation of over-voltage occurs is significantly reduced.

In some embodiments, voltage converter 715 is a step-down converter, and the output voltage of the step-down converter is about 4.5 V. In other embodiments, voltage converter 715 may be other types of converter, for example, a boost converter. The scope of the present disclosure is not intended to be limited in this respect.

With the intrinsically safe circuit as shown in FIG. 7, the current flowing through any of the power lines and the signal lines is limited, and the voltage applied to the transmitter by any two of the power lines and the signal lines is clamped. As a result, the energy is well limited no matter how the load is connected to the energy limiting device.

Figure 8:
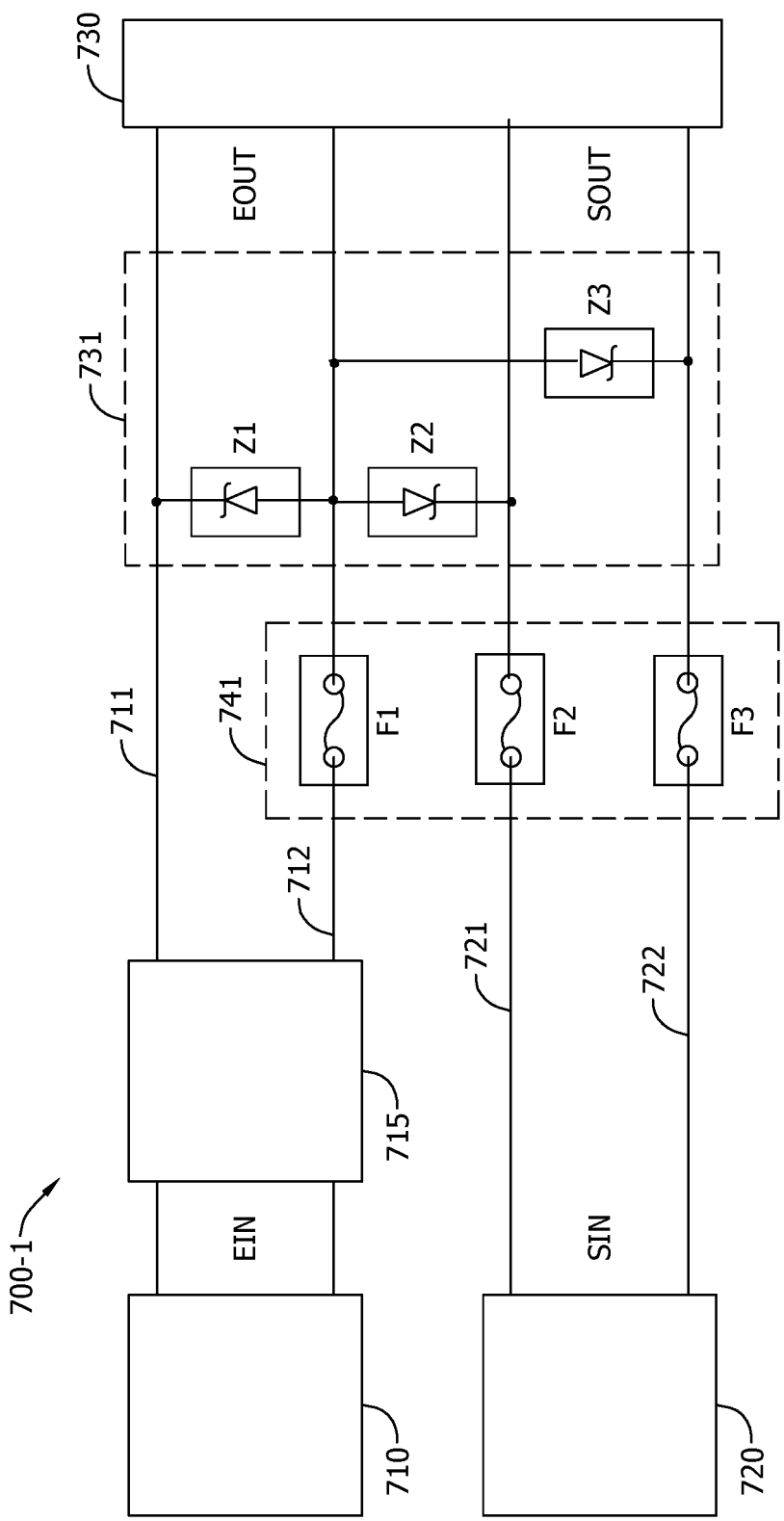
FIG. 8 is another exemplary intrinsically safe circuit for the transmitter assembly shown in FIG. 1A using a Modbus communication protocol.

FIG. 8 is a schematic block diagram of an intrinsically safe circuit in accordance with another embodiment of the present disclosure. As shown in FIG. 8, in addition to voltage converter 715, voltage clamping unit 731, and current limiting unit 741, intrinsically safe circuit 700-1 further includes power line surge unit 710, signal line surge unit 720, and communication unit 730.

Power line surge unit 710 is connected between a power supply and energy input ports EIN and is used to provide surge protection for first and second power lines 711, 712. Power line surge unit 710 also provides a voltage stabilizing function. Power line surge unit 710 may be any kind of surge devices.

Signal line surge unit 720 is connected between a signal source and signal input ports SIN and is configured to provide a surge protection for first and second signal lines 721, 722. Signal line surge unit 720 provides an improved signal transmission. Signal line surge unit 720 may be any kind of surge devices.

Communication unit 730 is connected to energy output ports EOUT and signal output ports SOUT and used to exchange signals between the load and a signal source. In some embodiments, communication unit 730 includes a Modbus device. In other embodiments, communication unit 730 may include other types of devices. The scope of the present disclosure is not intended to be limited in this respect.

Figure 9:
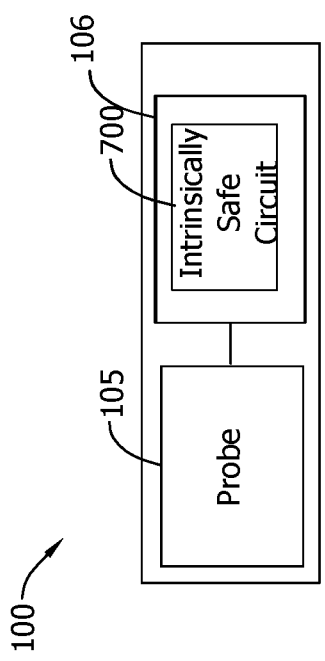
FIG. 9 is a schematic diagram of the transmitter assembly shown in FIG. 1A, illustrating the coupling between a probe of the transmitter assembly and an exemplary intrinsically safe circuit.

FIG. 9 is a schematic block diagram of exemplary transmitter assembly 100 including intrinsically safe circuit 700. As shown in FIG. 9, transmitter assembly 100 generally includes flexible probe 105 and intrinsically safe circuit 700-1 according to embodiments of the present disclosure.

In the exemplary embodiment, output of intrinsically safe circuit 700-1 is provided to other components of transmitting unit 106, which are electrically connected to flexible probe 105. Flexible probe 105 is used to measure a height of a liquid level, for example, gasoline. Different current value output by flexible probe 105 indicates different height of the liquid level.

With the transmitter assembly as shown in FIG. 9, as the energy of flexible probe 105 is well limited by intrinsically safe circuit 700-1, flexible probe 105 is used in explosive atmospheres. Compared with the transmitters carrying Explosion Proof (XP) or Flameproof (Exd) protection types, the transmitter assembly 100 reduces material and installation costs while meeting the requirement of Intrinsically Safe.

In some embodiments, transmitter 104 is a 4-20 mA transmitter, where analog current values are used to communicate measurements by probe 105. For such transmitters, when using intrinsically safe circuits together with transmitters operating in explosive atmospheres to prevent explosion by limiting the energy in the transmitter to a level below a threshold, there is an excessive leakage current flowing through a parallel path formed by clamping devices or protection circuits in conventional intrinsically safe circuits, resulting in an inaccurate measurement of transmitters and/ or a damage to components in the intrinsically safe circuits. Thus, there is a need for an intrinsically safe circuit with a low leakage current to increase the measurement accuracy of the transmitter and achieve increased energy limitation.

According to embodiments of the present disclosure, a voltage clamping unit and a current limiting unit are provided in the intrinsically safe circuit to limit the energy output to the load, and limit the leakage current of the intrinsically safe circuit to a predetermined leakage level. The above idea may be implemented in various manners, as will be described in detail in the following paragraphs.

Referring back to FIG. 6, when load 603 is a transmitter, load 603 uses the current flowing therethrough as a transmitter signal. The value of the current represents the measurement. For example, for a transmitter used to measure a height of a liquid level, the current value of the transmitter, such as in a range of 4-20 mA, represents the height of the liquid level. The accuracy of the current value directly impacts the measurement accuracy of the transmitter.

Conventional intrinsically safe circuit 601 or intrinsically safe barrier 601 results in a significant leakage current of 10-20 μA per Zener diode in a reverse direction when the voltage of power supply 602 is in the vicinity of the breakdown voltage of the Zener diode. The leakage current flows back to power supply 602 and influences the accuracy of the transmitter. Leakage current becomes more severe and more of a concern in explosive atmospheres where triple redundancy of the Zener circuit is required to meet the 'ia' protection. The inaccuracy in conventional intrinsically safe circuit 601 forces users to migrate to digital communication protocols, which increases costs from design changes and other associated activities.

Leakage current also reduces the level of working voltage for conventional intrinsically safe circuit 601. For example, if barriers 601 have a safety output voltage U0 of 28 V, vendors of barriers 601 typically limit the maximum working voltage to 24.9 V for a specified leakage current of 10 μA and the absolute maximum voltage to 25.9 V to prevent damage to the fuse in barrier 601. If observing a 3 V gap, 10 μA represents 0.06% error (100×0.01/16 mA), which does not meet the accuracy needed for many field transmitters.

Thus, there is a need for an intrinsically safe circuit with a low leakage current to increase accuracy in the measurement and achieve an increased energy limitation.

Figure 10:
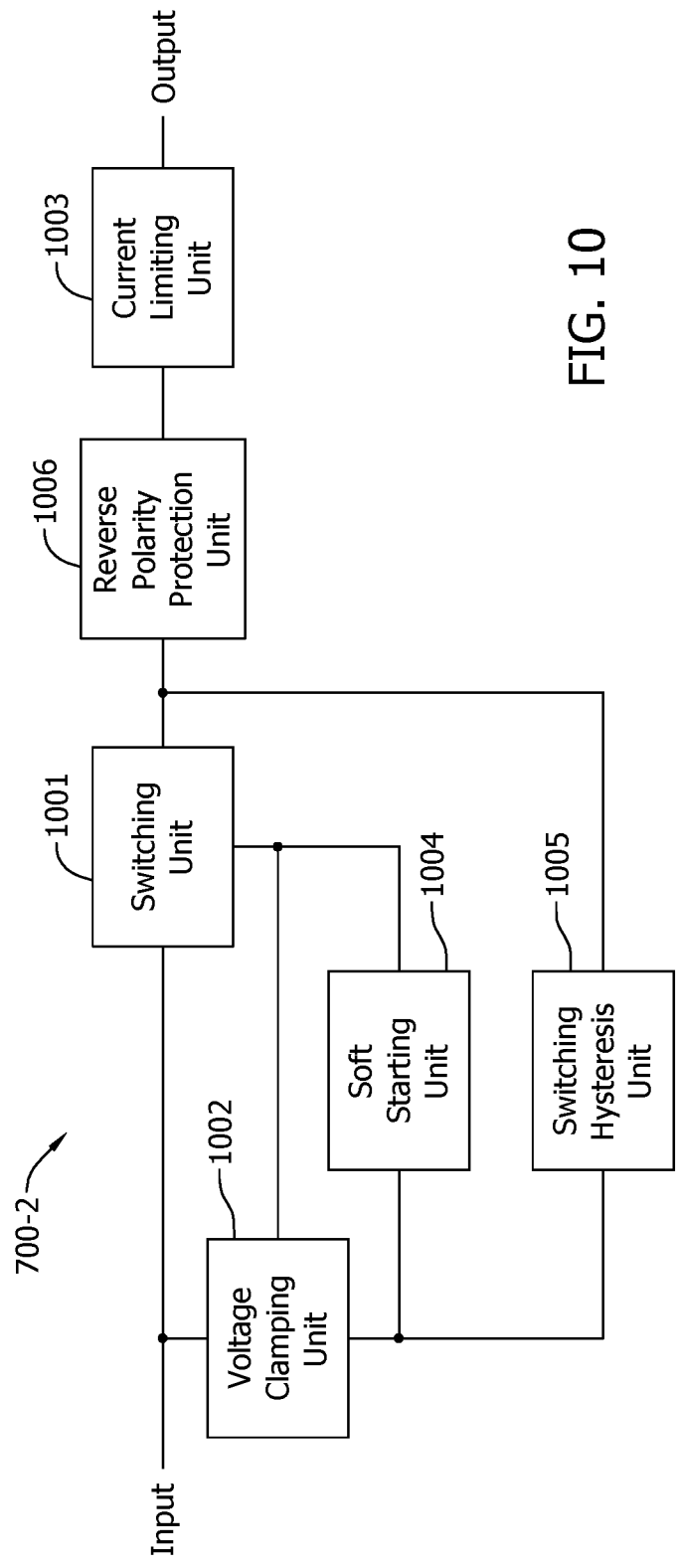
FIG. 10 is a block diagram of an exemplary intrinsically safe circuit for the transmitter assembly shown in FIG. 1A using a 4-20 mA communication protocol.
Figure 11:
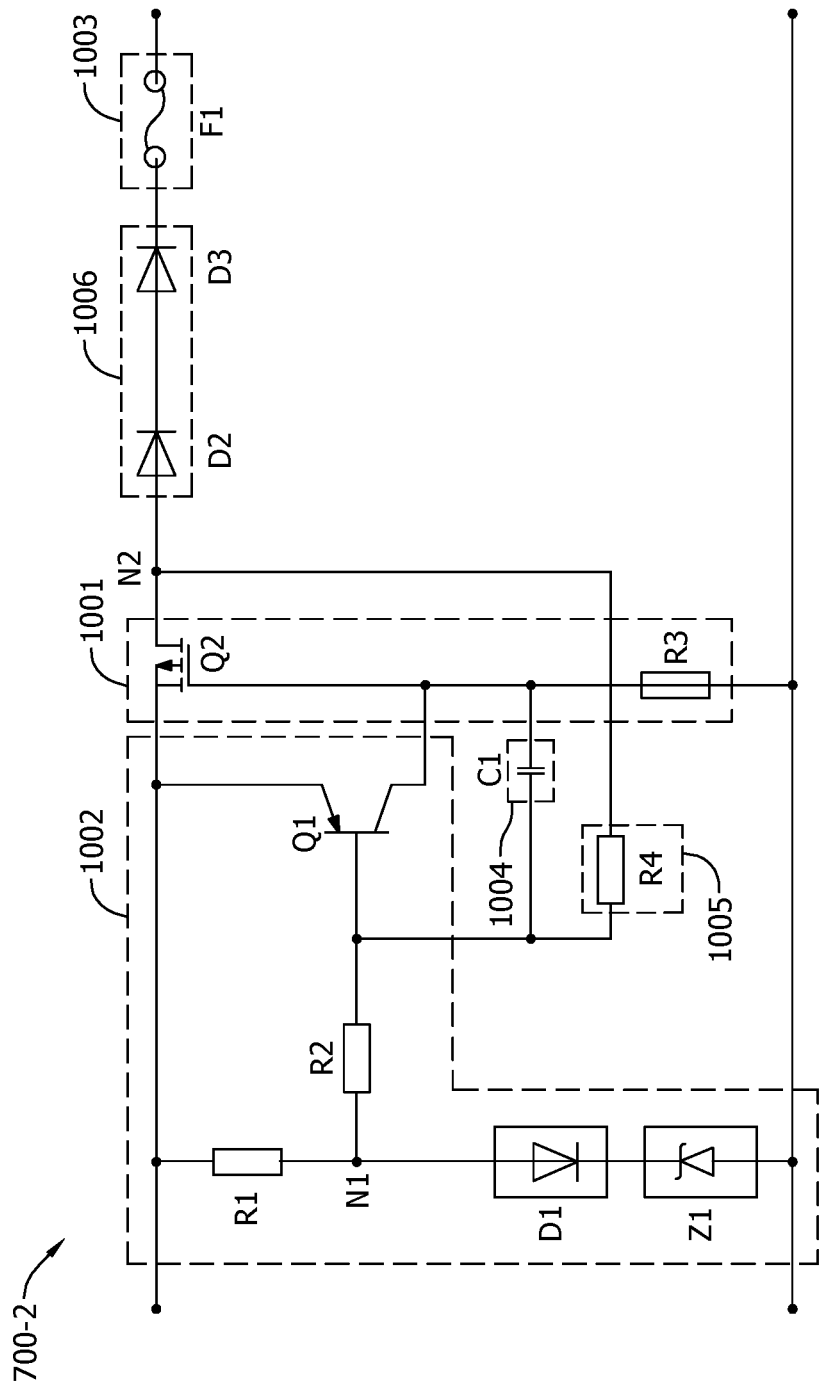
FIG. 11 is a circuit diagram of the intrinsically safe circuit shown in FIG. 10.

Another exemplary intrinsically safe circuit 700-2 is described in detail with reference to FIGS. 10 and 11. FIG. 10 is a schematic block diagram of intrinsically safe circuit 700-2 in accordance with an embodiment of the present disclosure, and FIG. 11 is a schematic circuit diagram of intrinsically safe circuit 700-2 in accordance with an embodiment of the present disclosure. As shown in FIG. 10, intrinsically safe circuit 700-2 generally includes switching unit 1001, voltage clamping unit 1002 and current limiting unit 1003.

As shown in FIG. 10, switching unit 1001 is connected between an input and an output of intrinsically safe circuit 700-2. The input of intrinsically safe circuit 700-2 is adapted to be connected to a power supply, and the output of intrinsically safe circuit 700-2 is adapted to be connected to a load, for example, a transmitter. Switching unit 1001 is used to deliver energy from the input to the output in a normal situation, and cut off the energy delivering in an over-voltage situation.

As shown in FIG. 11, in an embodiment, switching unit 1001 includes PMOS transistor Q2 and resistor R3. A source of transistor Q2 is connected to the input, a drain of transistor Q2 is connected to the output, a gate of transistor Q2 is connected to resistor R3, and resistor R3 is connected to the ground. In other embodiments, switching unit 1001 may include other components. The scope of the present disclosure is not intended to be limited in this respect.

Returning to FIG. 10, voltage clamping unit 1002 is connected to the input and switching unit 1001. Voltage clamping unit 1002 is used to turn off switching unit 1001 when an input voltage at the input of intrinsically safe circuit 700-2 exceeds a threshold voltage and clamp the input voltage to the threshold voltage. As a result, the energy delivered is cut off when an over-voltage occurs, and the voltage of the transmitter is clamped. Furthermore, voltage clamping unit 1002 is used to limit a leakage current through voltage clamping unit 1002 to be below a predetermined leakage current level when the input voltage is in the vicinity of the threshold voltage, thereby improving the accuracy of a current type transmitter.

As shown in FIG. 11, in an embodiment, voltage clamping unit 1002 includes resistor R1, resistor R2, PNP transistor Q1, diode D1, and Zener diode Z1. Resistor R1 is connected between the input and an anode of diode D1. A cathode of diode D1 is connected to a cathode of Zener diode Z1, and an anode of Zener diode Z1 is connected to the ground. An emitter of transistor Q1 is connected to the input, a collector of transistor Q1 is connected to the gate of transistor Q2, and a base of transistor Q1 is connected to the anode of diode D1 via resistor R2. In other embodiments, voltage clamping unit 1002 may include other components. The scope of the present disclosure is not intended to be limited in this respect.

In some embodiments, the breakdown voltage of Zener diode Z1 is 30 V. In other embodiments, the breakdown voltage of Zener diode Z1 may be other values, for example, 28 V, 32 V. The scope of the present disclosure is not intended to be limited in this respect.

In some embodiments, the leakage current of Zener diode Z1 is limited to 5 nA. In other embodiments, the leakage current of Zener diode Z1 may be limited to other values, for example, 10 nA or 20 nA. The scope of the present disclosure is not intended to be limited in this respect.

Returning to FIG. 10, current limiting unit 1003 is connected between switching unit 1001 and the output, current limiting unit 1003 is used to limit the current flowing into the load. When the current flowing into the load exceeds a threshold value, current limiting unit 1003 cuts off the current. As a result, the value of current in the load is limited below the threshold value.

As shown in FIG. 11, in an embodiment, current limiting unit 1003 includes fuse F1. When the current exceeds the threshold value, the fuse will be disconnected. In other embodiments, current limiting unit 1003 may include other components. The scope of the present disclosure is not intended to be limited in this respect.

In some embodiments, the fusing current of fuse F1 is 28 mA. In other embodiments, the fusing current of fuse F1 may be other values, for example, 26 mA, 30 mA, 40 mA, 50 mA, 62 mA, 80 mA, & 100 mA. The scope of the present disclosure is not intended to be limited in this respect.

Returning to FIG. 10, in some embodiments, intrinsically safe circuit 700-2 further includes soft starting unit 1004. Soft starting unit 1004 is connected between voltage clamping unit 1002 and switching unit 1001. Soft starting unit 1004 is used to soft start intrinsically safe circuit 700-2 to prevent an inrush current when power is switched on and supplied to intrinsically safe circuit 700-2.

As shown in FIG. 11, in an embodiment, soft starting unit 1004 includes capacitor C1. Capacitor C1 is connected between the base of transistor Q1 and the gate of transistor Q2. In other embodiments, soft starting unit 1004 may include other components. The scope of the present disclosure is not intended to be limited in this respect.

Returning to FIG. 10, in some embodiments, intrinsically safe circuit 700-2 further includes switching hysteresis unit 1005. Switching hysteresis unit 1005 is connected between voltage clamping unit 1002 and an output terminal of switching unit 1001. Switching hysteresis unit 1005 is used to generate a switching hysteresis signal that prevents switching unit 1001 from flipping between on and off states due to the noise in the intrinsically safe circuit or the resistance in the power supply.

As shown in FIG. 11, in an embodiment, switching hysteresis unit 1005 includes resistor R4. Resistor R4 is connected between the base of transistor Q1 and the drain of transistor Q2. In other embodiments, switching hysteresis unit 1005 may include other components. The scope of the present disclosure is not intended to be limited in this respect.

In some embodiments, the resistance value of resistor R4 is 120 times the resistance of resistor R2. In other embodiments, the ratio of resistor R4 and resistor R2 may be other values, for example, 100, 150, 200. The scope of the present disclosure is not intended to be limited in this respect.

Returning to FIG. 10, in some embodiments, intrinsically safe circuit 700-2 further includes reverse polarity protection unit 1006. Reverse polarity protection unit 1006 is connected between switching unit 1001 and current limiting unit 1003. Reverse polarity protection unit 1006 is used to prevent a reverse voltage from being applied to the load, such as the transmitter.

As shown in FIG. 11, in an embodiment, reverse polarity protection unit 1006 includes two diodes D2 and D3. Diodes D2 and D3 are connected in series between the drain of transistor Q2 and fuse F1. When the input voltage is reversed, the input voltage will not be applied to the transmitter due to diodes D2 and D3. In other embodiments, reverse polarity protection unit 1006 may include other components. The scope of the present disclosure is not intended to be limited in this respect.

In some embodiments, the reverse polarity protection unit 1006 includes more than two diodes. In other embodiments, the reverse polarity protection unit 1006 includes only one diode. The scope of the present disclosure is not intended to be limited in this respect.

Hereinafter, the principles of intrinsically safe circuit 700-2 will be described in detail with reference to FIG. 11.

Initially, when the input is connected to a power supply, the voltage on the base of transistor Q1 is 0V. When the voltage between the base and emitter of Q1 is equal to the input voltage (Vbe~=Uin), transistor Q1 is turned on. Because Q1 is conducting, the gate voltage of transistor Q2 is pulled up to the input voltage Uin, and transistor Q2 is turned off.

Concurrently, capacitor C1 is charged and integrates current flowing through resistors R1 and R2, increasing the voltage at the base of transistor Q1. The voltage increase at the base of transistor Q1 reduces base-emitter voltage Vbe of transistor Q1. When the base-emitter voltage Vbe of transistor Q1 is reduced to be below a threshold voltage or turn-on voltage of transistor Q1, transistor Q1 is turned off, and the gate of transistor Q2 is connected to the ground via resistor R3. Transistor Q2 is turned on. Thus, the soft starting of intrinsically safe circuit 700-2 is achieved. The RC time constant of resistors R1 and R2 and capacitor C1 delays the start of circuit 700-2, provides soft start of circuit 700-2, and reduces inrush current to circuit 700-2. In one example, the soft starting reduces inrush current by more than 10 times, thereby allowing the use of fuses with reduced ratings that are close to the maximum operating current of the load without the risk of damage from the inrush current during startup.

In a normal situation, the energy is delivered from the input to the output via transistor Q2. When the input voltage exceeds the sum of the breakdown voltage of Zener diode Z1 (Vz1, for example, 30 V), the forward voltage of diode D1 (VfD1, for example, 0.7 V) and the base-emitter saturation voltage of transistor Q1, an over-voltage occurs. At this time, the base-emitter voltage of transistor Q1 exceeds the turn-on voltage of transistor Q1, such that transistor Q1 is turned on. As a result, transistor Q2 is turned off, such that the energy delivering is cut off.

At the same time, Zener diode Z1 is reverse conducted. The voltage V1 at node N1 is clamped. Meanwhile, the leakage current of Zener diode Z1 is limited by resistor R1 and diode D1. Compared with the leakage current in the conventional intrinsically safe circuit, the leakage current in intrinsically safe circuit 700-2 may be reduced to a thousandth of the leakage current in the conventional intrinsically safe circuit.

Still at this time, because transistor Q2 is turned off, the voltage V2 at node N2 generally is equal to the sum of the forward voltage of the diode D2 (VfD2, for example, 0.7 V) and the forward voltage of diode D3 (VfD3, for example, 0.7 V), because node N2 is pulled to ground via diodes D2, D3 and the load. Voltage Vb on the base of transistor Q1 is calculated as:

$Vb=(V2-V1)*R2/(R2+R4)=(VfD2+VfD3-Vz1-VfD1)$
$*R2/(R2+R4)$

Because V2 is smaller than V1, this creates a negative offset. As a result, transistor Q1 is turned on reliably, and thus transistor Q2 is turned off reliably. Accordingly, a switching hysteresis is achieved.

In one example, the leakage current of intrinsically safe circuit 700-2 is approximately 15 nA, allowing for the use of input voltages up to the maximum output voltage U0.

With the intrinsically safe circuit as shown in FIG. 11, the current of the transmitter is limited, the voltage applied to the transmitter is clamped, and the leakage current of the Zener diode is limited. As a result, the energy is well limited, and the measurement accuracy of the transmitter is increased. Intrinsically safe circuit 700-2 has gone through explosive atmospheres assessment and is suitable to be used in a hazardous environment.

Referring back to FIG. 9, the principles of a transmitter assembly including intrinsically safe circuit 700-2 will be described in detail. In the exemplary embodiment, output of intrinsically safe circuit 700-2 is provided to other components of transmitting unit 106, which are electrically connected to flexible probe 105. With the transmitter assembly as shown in FIG. 9, as the energy of flexible probe 105 is well limited by intrinsically safe circuit 700-2, flexible probe 105 is used in explosive atmospheres. Compared with the transmitters that carry Explosion Proof (XP) or Flameproof (Exd) protection types, transmitter assembly 100 reduces material and installation costs while meeting the requirement of being intrinsically safe. Further, the requirement of being intrinsically safe increases the accuracy of measurements of transmitter assembly 100.

Referring back again to FIG. 6, leakage current introduces error and reduces accuracy in measurements by the transmitter. Further, the output voltage from barrier 601 is reduced due to the leakage current, as well as end-to-end resistance, which is around 300 ohms-340 ohms, and accounts for a voltage drop of up to 7.2 V (340 ohms×21 mA, where loop current is 21 mA). If additional voltage drop across series diodes for reverse polarity protection is considered, the voltage drop within barrier 601 exceeds 8 V, which significantly affect the minimum supply voltage that may be used with the transmitters. For a transmitter that requires 12.0 V supply, the choice of power supply would be narrowed to the range of 20 V-24.9 V. The range may be further narrowed from the maximum being 24.9 because 24.9 V may not be acceptable for some transmitters.

Additionally, barrier 601 has limited tolerance of overvoltage, resulting in permanent damage to fuse F0. For example, fuse F0 may be damaged because of unintentional short circuits during installations or high inrush currents during powering up and hot-plugging. Although a well-regulated voltage source may be used as power supply 602 to output a stable voltage below the breakdown voltage of the Zener diode and to avoid damage to fuse F0, the cost of such a power supply is relatively high, and prolonged voltage spikes sometimes are inevitable.

Figure 12:
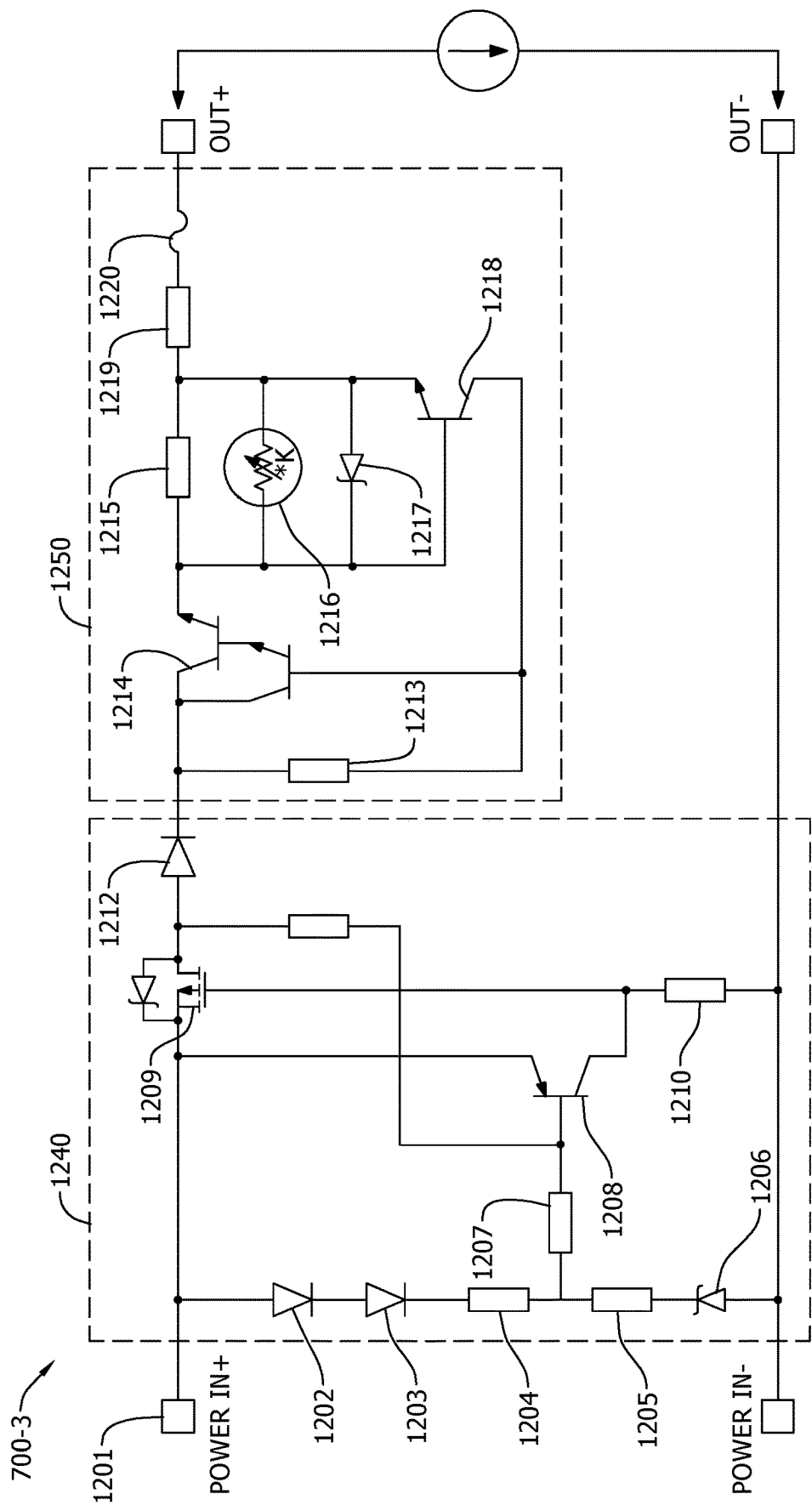
FIG. 12 is a circuit diagram of another exemplary intrinsically safe circuit for the transmitter assembly shown in FIG. 1A using a 4-20 mA communication protocol.

FIG. 12 is a circuit diagram of one more exemplary intrinsically safe circuit 700-3 used in transmitter assembly 100. Circuit 700-2 shown in FIGS. 10 and 11 is suitable for most applications but is inadequate when the current output (Io) to the load, e.g., a 4-20 mA device, is very close to or slightly higher than the maximum operation current (Iop). For example, if Io≤1.5 Iop, the fuses in circuit 700-2 are at a high risk of being damaged by inrush current generated during power up or hot plugging of the transmitter, resulting in permanent damage of circuit 700-2.

In the exemplary embodiment, intrinsically safe circuit 700-3 includes voltage clamping unit 1240. When the power is applied through positive input terminal 1201, current reaches the source of p-channel MOSFET 1209 that is a switching element in circuit 700-3, and simultaneously the gate of MOSFET 1209 is pulled down to ground through resistor 1210, turning MOSFET 1209 on. PNP transistor 1208 is used to control the state of switching element 1209. The bias circuit of transistor 1208 includes diodes 1202 and 1203, resistors 1204, 1205 and 1207, and Zener diode 1206. The input voltage is applied to the bias circuit. The over-voltage threshold $V_{th}$, the input voltage required to turn circuit 700-3 off, is equal to the sum of voltage $V_z$ across Zener diode 1206, base-emitter voltage $V_{be}$ of transistor 1208, and voltage drop $V_{(5, 7)}$ across resistors 1205, 1207. That is, $V_{th}=V_z+V_{be}+V_{(5, 7)}$. Leakage current flowing through resistors 1205, 1207 is small, e.g., below 1 nA, and therefore the voltage across resistors 1205, 1207 is small, e.g., below 1 mV, and may be neglected in the evaluation of $V_{th}$, resulting in $V_{th}=V_z+V_{be}$.

Under normal operation where input voltage Ui at terminal 1201 is below over-voltage threshold $V_{th}$, $U_i<V_{th}$, base-emitter voltage $V_{be}$ of transistor 1208 is insufficient to turn transistor 1208 on. As a result, voltage at the gate of transistor 1209 remains pulled-down to ground, keeping transistor 1209 on.

When input voltage $U_i$ at terminal 1201 is equal to or greater than over-voltage threshold $V_{th}$, base-emitter voltage $V_{be}$ of transistor 1208 becomes sufficient to turn transistor 1208 on, resulting in voltage at the gate of transistor 1209 is pulled-up to input voltage $U_i$, turning transistor 1209 off.

In circuit 700-3, the goal is to achieve safe output voltage $U_0$ to be approximately equal to Zener voltage $V_z$, $U_o=V_z$. The maximum voltage at the drain of transistor 1209 is over-voltage threshold $V_{th}$, where $V_{th}=V_z+V_{be}$. In order to compensate for the excess voltage in the maximum voltage at the drain of transistor 1209, diode 1212 is added. Diode 1212 is selected with a forward voltage equal to or greater than base-emitter voltage $V_{be}$ of transistor 1208 such that $V_{be}=V_D$ can be assumed. As a result, the voltage at the output is equal to the voltage at the clamping stage, $U_o=V_z$.

The leakage current to ground through voltage clamping unit 1240 is approximately 40 nA, when input voltage $U_i$ equals to the Zener voltage of Zener diode 1206, $U_i=V_z$. The leakage current is two order, i.e., in the order of approximately 100 times, lower than the leakage current in conventional intrinsically safe barrier 601 calculated under the condition that the input voltage is approximately 3 V lower than the Zener voltage, $U_i=V_z-3$ V.

Circuit 700-3 also tolerates input voltage in excess of the safe output voltage but below over-voltage threshold $V_{th}$, $U_i<V_{th}$. Base-emitter voltage $V_{be}$ of transistor 1208 is insufficient to turn transistor 1208 on. As a result, voltage at the gate of transistor 1209 remains pulled-down to ground, keeping transistor 1209 turned on.

In the exemplary embodiment, circuit 700-3 further includes current limiting unit 1250. Current limiting unit 1250 includes transistor 1214 as a current switch and transistor 1218 as a current control.

In operation, initially transistor 1214 is turned on due to biasing of the base of transistor 1214 with a fixed current through resistor 1213. Before current flows, the voltage across resistor 1215 is small, and therefore the base-emitter voltage is insufficient to turn transistor 1218 on. When the current flowing through circuit 700-3 increases because of either inrush current from power up or excessive load during runtime, the voltage across resistor 1215 increases to the point that the base-emitter voltage of transistor 1218 is sufficient to turn transistor 1218 on, which pulls down the base-emitter voltage of transistor 1214 enough to partially turn transistor 1214 off. The resistance of sensing resistor 1215 determines the current limit, $R_{15}=V_{be}/I_{limit}$, where $V_{be}$ is the base-emitter voltage of transistor 1218. In this way, transistors 1214, 1218 and resistors 1213, 1215 manage the current limit or the current allowed to flow through circuit 700-3. In some embodiments, because the base-emitter voltages of transistors 1214, 1218 change with temperature, the current limit changes with temperature. Negative temperature coefficient (NTC) thermistor 1216, a resistor having an NTC, is included in current limiting unit 1250. NTC thermistor 1216 is electrically connected in parallel with resistor 1215 to compensate for the change of the base-emitter voltages with temperature. Addition of NTC thermistor 1216 reduces the changes of the current limit with temperature by a ratio of 3, compared to current limiting unit 1250 without NTC thermistor 1216. In other embodiments, current limiting unit 1250 includes fast-acting transient suppressor 1217 that is used to protect base-emitter junction of transistor 1218.

In the exemplary embodiment, current limiting unit 1250 further includes fuse 1220. Fuse 1220 further ensures the safe output current is not exceeded, even when the rest of current limiting unit 1250 fails. Resistor 1219 having a resistance complying with a standard, such as IEC 60079-11, is included to reduce the current.

Table 1 summarizes a comparison of known barriers 601 from suppliers in the market with circuit 700-3.

| Item | Uo (V) | Io (mA) | Leakage current (µA) at input voltage | | | | | Voltage drop at 21 mA |
|---|---|---|---|---|---|---|---|---|
| | | | 28.2 V | 28 V | 26.6 V | 25.5 V | 24 V | |
| Circuit 700-3 | 28 | 48 | 9 | 0.189 | 0.009 | 0.009 | 0.009 | 3.5 V |
| Allen Bradley 937ZH-DPAN-2 | 28 | 46 | | Fuse damage | | 1-10 | — | 14 V |
| Stahl 9001/01-280-050-101 | 28 | 50 | | Unknown | | | 2 | 14 V |
| Stahl 9001/01-280-075-101 | 28 | 75 | | | | | 2 | 9.7 V |
| MTL728 | 28 | 93 | | Fuse damage | | 1-10 | — | 7.2 V |
| Pepper Fuchs Z728 | 28 | 93 | | Fuse damage | | 1-10 | | 6.9 V |
| Allen Bradley 937ZH-DPBN-1 | 28 | 93 | | Fuse damage | | 1-10 | — | 6.9 V |

As shown in Table 1, circuit 700-3 as described herein provides superior performance of having lower leakage current than know barriers 601, even when circuit 700-3 is powered with a higher input voltage. Further, most of known barriers 601 are damaged when the input voltage reaches 26.6 V, while circuit 700-3 survives an input voltage of 90 V without damage, although the output is turned off by the over-voltage circuit when the input voltage exceeds 28.3 V. Further, the voltage drop of circuit 700-3 is lower than known barrier 601, which is suitable for being used with transmitters or transmitters requiring 12 V supply. In addition, known barriers 601 that have relatively low Io also have a relatively large voltage drop because series of resistors are typically used to limit the current, restricting the known barriers from being used in transmitters requiring a minimum supply voltage of 12 V and Io less than 50 mA.

Moreover, the parameters in circuit 700-3 is adjustable. For example, in order to change output voltage $U_o$, Zener diode 1206 having a different Zener voltage is selected. In another example, changing resistors 1215 is used to change the safe output current Io.

At least one technical effect of the systems and methods described herein includes (a) a separation assembly configured to threadedly couple with a partition wall between different EPLs in a hazardous environment; (b) a nut having interior threads and exterior threads of opposite sloping directions to facilitate installation of a hermetic seal without the hermetic seal being rotated while connected with wires; (c) a socket wrench and a seal wrench for facilitating installation of a hermetic seal; (d) an installation method of coupling a hermetic seal to a threaded partition wall without the hermetic seal being rotated; and (e) an intrinsically safe circuit in the transmitter assembly to limit energy entering into a more hazardous area in the hazardous environment.

Exemplary embodiments of assemblies, circuits, and methods of transmitters are described above in detail. The assemblies, circuits, and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A transmitter assembly for a hazardous environment, comprising:
   a transmitter comprising:
      a transmitting unit configured to be positioned in a first area of the hazardous environment, wherein the transmitting unit includes an intrinsically safe circuit; and
      a probe coupled with the transmitting unit and configured to be positioned in a second area of the hazardous environment, wherein the second area is more hazardous and has a higher equipment protection level than the first area,
      wherein the probe is electrically connected directly or indirectly to the intrinsically safe circuit; and
   a separation assembly positioned between the transmitting unit and the probe, the separation assembly comprising:

a hermetic seal configured to be electrically connected to the transmitting unit and the probe; and
a nut defining a tunnel sized to receive the hermetic seal therein, wherein the nut has an exterior surface and exterior threads formed on the exterior surface,
wherein the exterior threads of the nut are complementary to threads on a partition wall positioned between the transmitting unit and the probe, and
wherein the nut has an interior surface opposite the exterior surface and interior threads formed on the interior surface, the exterior threads and the interior threads sloping in opposite directions.

2. The transmitter assembly of claim 1, wherein the hermetic seal further comprises exterior threads formed on a side surface of the hermetic seal and complementary to the interior threads of the nut.

3. The transmitter assembly of claim 1, further comprising a seal wrench and a socket wrench, wherein the socket wrench is configured to engage with the nut and rotate the nut, and the seal wrench is configured to engage with the hermetic seal and hold the hermetic seal stationary while the nut is being rotated.

4. The transmitter assembly of claim 3, wherein the hermetic seal includes a top surface facing the transmitting unit, and the top surface defines a plurality of recesses.

5. The transmitter assembly of claim 4, wherein the seal wrench includes a plurality of pins sized to be received in the recesses.

6. The transmitter assembly of claim 3, wherein the nut further comprises a plurality of projections, the plurality of projections define a plurality of recesses, and the socket wrench includes a plurality of feet sized to be received in the plurality of recesses of the nut.

7. The transmitter assembly of claim 1, wherein the probe includes a thermoplastic membrane.

8. The transmitter assembly of claim 1, wherein the transmitting unit communicates using a communication protocol, and the intrinsically safe circuit further comprises:
a first power line and a second power line;
a first signal line and a second signal line;
a voltage clamping unit configured to clamp a voltage between any two of the first power line, the second power line, the first signal line, and the second signal line; and
a current limiting unit configured to limit current flowing through the first power line, the second power line, the first signal line, and the second signal line.

9. The transmitter assembly of claim 1, wherein the intrinsically safe circuit further comprises:
an input configured to be connected to a power supply;
an output;
a switching unit connected between the input and the output and configured to deliver an energy from the input to the output;
a voltage clamping unit connected to the input and the switching unit, the voltage clamping unit configured to turn off the switching unit when an input voltage at the input exceeds a threshold voltage and clamp the input voltage to the threshold voltage, and the voltage clamping unit configured to limit a leakage current through the voltage clamping unit below a predetermined leakage current level when the input voltage is in a vicinity of the threshold voltage; and
a current limiting unit connected between the switching unit and the output and configured to limit a current to the output.

10. The transmitter assembly of claim 1, wherein the intrinsically safe circuit includes a current limiting unit configured to manage current flow through the intrinsically safe circuit.

11. A separation assembly of a transmitter assembly for a hazardous environment, the transmitter assembly including an intrinsically safe circuit, the separation assembly comprising:
a hermetic seal configured to be electrically connected to a transmitting unit and a probe of the transmitter assembly; and
a nut defining a tunnel sized to receive the hermetic seal therein, wherein the nut has an exterior surface and exterior threads formed on the exterior surface,
wherein the exterior threads of the nut are complementary to threads on a partition wall positioned between the transmitting unit and the probe, and
wherein the nut has an interior surface opposite the exterior surface and interior threads formed on the interior surface, the exterior threads and the interior threads sloping in opposite directions.

12. The separation assembly of claim 11, wherein the hermetic seal further comprises exterior threads formed on a side surface of the hermetic seal and complementary to the interior threads of the nut.

13. The separation assembly of claim 11, further comprising a seal wrench and a socket wrench, wherein the socket wrench is configured to engage with the nut and rotate the nut, and the seal wrench is configured to engage with the hermetic seal and hold the hermetic seal stationary while the nut is being rotated.

14. The separation assembly of claim 13, wherein the hermetic seal includes a top surface, the top surface defines a plurality of recesses, and the seal wrench includes a plurality of pins sized to be received in the recesses.

15. The separation assembly of claim 13, wherein the nut further comprises a plurality of projections, the plurality of projections define a plurality of recesses, and the socket wrench includes a plurality of feet sized to be received in the plurality of recesses of the nut.

16. A method of installing a separation assembly of a transmitter assembly between different equipment protection levels in a hazardous environment, the transmitter assembly including an intrinsically safe circuit, the method comprising:
providing a hermetic seal and a nut, wherein the hermetic seal is configured to be electrically connected to a transmitting unit and a probe of the transmitter assembly, and
the nut defines a tunnel sized to receive the hermetic seal therein, wherein the nut has an exterior surface and exterior threads formed on the exterior surface, and the exterior threads of the nut are complementary to threads on a partition wall positioned between the transmitting unit and the probe, and wherein the nut has an interior surface opposite the exterior surface and interior threads formed on the interior surface, the exterior threads and the interior threads sloping in opposite directions;
coupling the probe with the hermetic seal;
coupling the hermetic seal with the nut;
engaging a seal wrench with the hermetic seal;
engaging a socket wrench with the nut; and
rotating the nut via the socket wrench while holding the hermetic seal stationary via the seal wrench.

17. The method of claim 16, wherein coupling the hermetic seal further comprises coupling the hermetic seal with the nut by one turn of threads.

18. The method of claim 16, wherein engaging a seal wrench further comprises engaging pins of the seal wrench in recesses of the hermetic seal, and
engaging a socket wrench further comprises engaging feet of the socket wrench in recesses of the nut.

\* \* \* \* \*